(12) United States Patent
Pallakoff

(10) Patent No.: US 8,542,196 B2
(45) Date of Patent: Sep. 24, 2013

(54) SYSTEM AND METHOD FOR A THUMB-OPTIMIZED TOUCH-SCREEN USER INTERFACE

(75) Inventor: Matt Pallakoff, Mountain View, CA (US)

(73) Assignee: MOVE Mobile Systems, Inc., Mountain View, CA (US)

(*) Notice: Subject to any disclaimer, the term of this patent is extended or adjusted under 35 U.S.C. 154(b) by 1236 days.

(21) Appl. No.: 11/994,648

(22) PCT Filed: Jul. 21, 2006

(86) PCT No.: PCT/US2006/028457
§ 371 (c)(1),
(2), (4) Date: Jan. 3, 2008

(87) PCT Pub. No.: WO2007/014064
PCT Pub. Date: Feb. 1, 2007

(65) Prior Publication Data
US 2009/0303187 A1  Dec. 10, 2009

Related U.S. Application Data

(60) Provisional application No. 60/701,560, filed on Jul. 22, 2005.

(51) Int. Cl.
*G06F 3/041* (2006.01)

(52) U.S. Cl.
USPC .................................... 345/173; 345/156

(58) Field of Classification Search
USPC ......................................... 345/156–173
See application file for complete search history.

(56) References Cited

U.S. PATENT DOCUMENTS

| | | | |
|---|---|---|---|
| 6,256,021 B1 * | 7/2001 | Singh | 345/173 |
| 7,154,483 B2 * | 12/2006 | Kobayashi | 345/173 |
| 2003/0063073 A1 | 4/2003 | Geaghan et al. | |
| 2003/0197687 A1 * | 10/2003 | Shetter | 345/173 |
| 2004/0080487 A1 | 4/2004 | Griffin et al. | |
| 2004/0150630 A1 * | 8/2004 | Hinckley et al. | 345/173 |
| 2004/0222973 A1 * | 11/2004 | Stanhope et al. | 345/173 |
| 2006/0085757 A1 * | 4/2006 | Andre et al. | 715/771 |

* cited by examiner

*Primary Examiner* — Viet Pham
(74) *Attorney, Agent, or Firm* — Nathan H. Calvert

(57) ABSTRACT

A virtual thumb-board solution is provided that fits on a pocket-size device or even palm-size device and uses the standard keyboard layout with straight rows of keys, which is achieved while making the virtual thumb-board accurate, fast, and comfortable. And thumb-optimized virtual User Interface solutions are provided that make information searching and UI navigation on pocket-size hand-held devices exceptionally fast and intuitive.

21 Claims, 12 Drawing Sheets

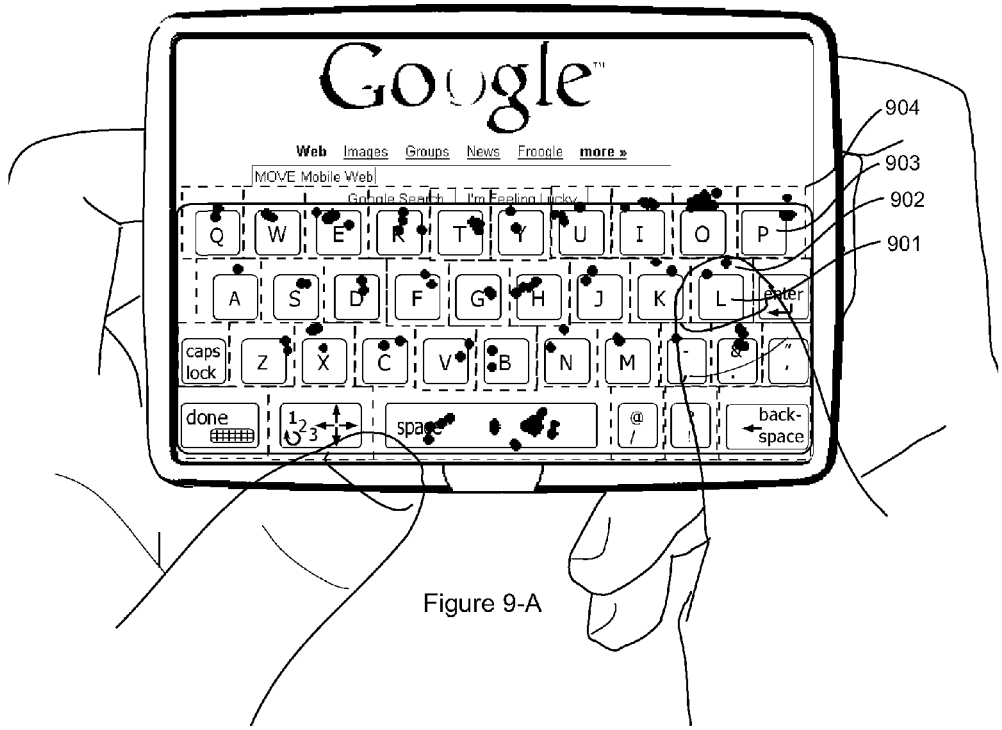
Figure 9-A
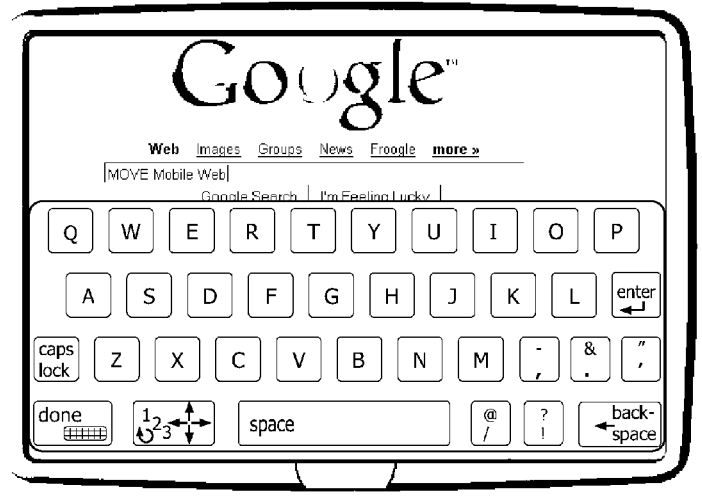
Figure 9-B

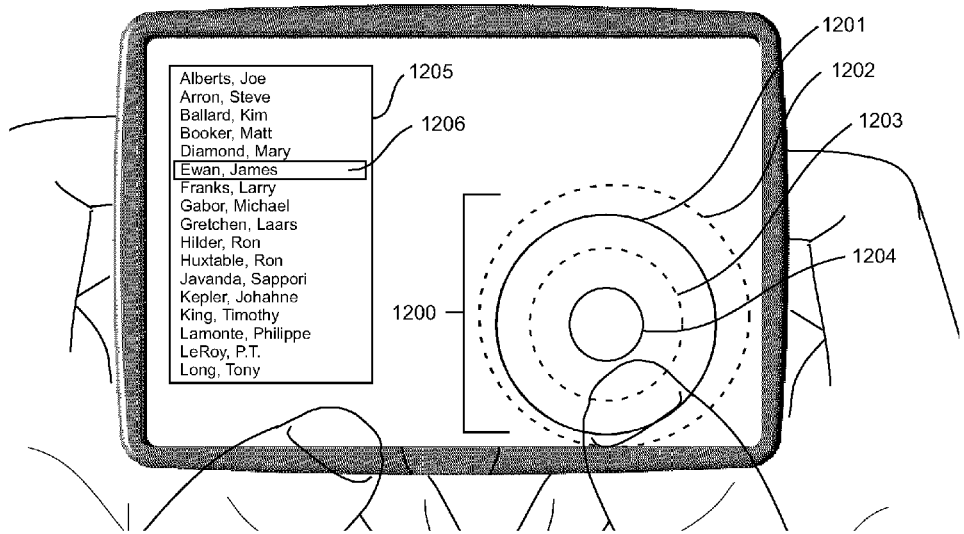
Figure 12-A
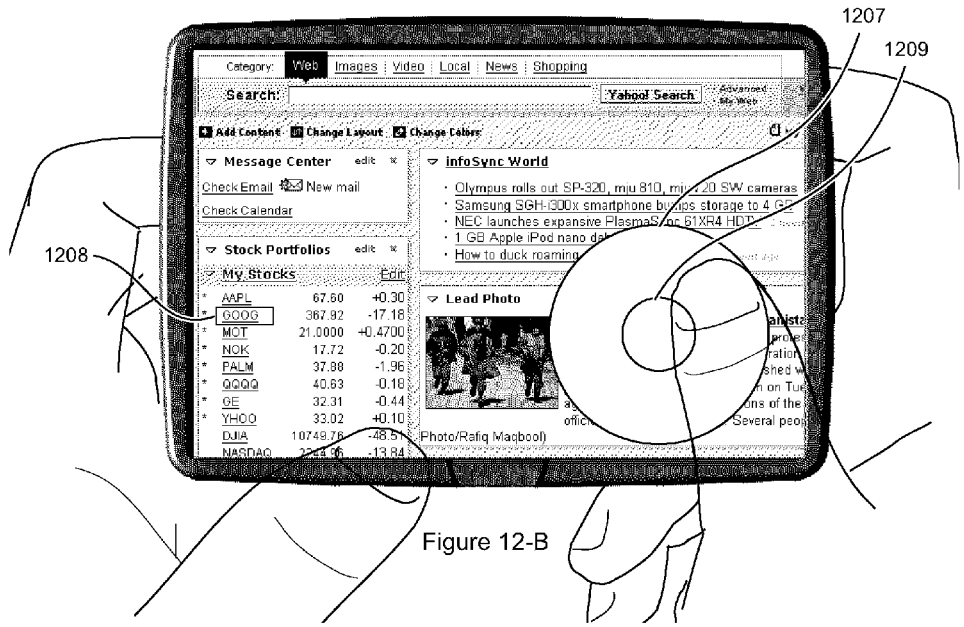
Figure 12-B

SYSTEM AND METHOD FOR A THUMB-OPTIMIZED TOUCH-SCREEN USER INTERFACE

CROSS-REFERENCE TO RELATED APPLICATIONS

The present Utility patent application is the National Phase filing under 35 U.S.C. 371 of the International Application No PCT/US2006/028457 filed on Jul. 21, 2006 and entitled "System and Method for a Thumb-Optimized Touch-Screen User Interface".

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates to handheld, electronic devices. More particularly, the invention relates to systems and methods for thumb-optimized, touch-screen based typing, information searching, and user interface (UI) control on handheld, electronic devices.

BACKGROUND OF THE INVENTION

Mobile phones have long supported relatively awkward text input using a numeric keypad, for text messaging. Other classes of pocketsize hand-held devices have attempted to allow richer text input, for tasks such as, but not limited to, email and Internet access. These devices have generally either required the user to enter text using a stylus or by pressing keys on an attached or embedded mechanical QWERTY keyboard (e.g. a miniature version of the keyboard used on computers). (The terms "mechanical" and "physical" will be used interchangeably in the context of describing keyboards here—as a means to distinguish such keyboards from "virtual" keyboards" as described below.)

When using a stylus, either the user draws letters on the touch screen of the device with the device using handwriting recognition software to determine what the user is writing, or the user taps images of keys on a virtual keyboard image on the device's display. In each case, using a stylus to write or tap out letters tends to be relatively slow and awkward. Two examples of devices that require a stylus for text input are, without limitation, the Palm Vx (among other older Palm devices) and the newer Nokia 770 Internet Tablet.

Devices that include small physical keyboards on which users type using their thumbs, such as, but not limited to, Blackberry devices from Research in Motion and some more recent Treo devices from Palm One, have proven to be popular among people who frequently want to type on pocket-sized, handheld devices, at least in part because thumb-typing on these miniature typewriter-like mechanical keyboards (often called "thumb-boards") has proven to be relatively fast and comfortable for people who already know how to type on full-size computer keyboards or typewriters. People generally find using mechanical thumb-boards to be significantly faster and easier than using a stylus to tap keys on a virtual keyboard or to draw characters for a device's handwriting recognition software. And they find it much easier than typing text on standard phone keypads.

However, there are a number of negative results from including these mechanical thumb-boards. The extra dozens of buttons and electronics that comprise these mechanical keyboards increase the cost, size, weight, and thickness of devices. Also, it increases the likelihood of something breaking on those devices compared to devices that do not include the extra buttons and electronics. Attaching or embedding a tiny computer-like keyboard makes those devices look more intimidating and less consumer-friendly, compared to other famously consumer-friendly devices that do not have mechanical keyboards, such as, but not limited to, Apple Computer's iPod. Also, a mechanical thumboard makes the form-factor and grip awkward if a user wants use their thumbs to select items on the display of the device.

Herein the terms "virtual keyboard", "virtual thumboard", and "onscreen keyboard" are used interchangeably, except where otherwise noted. It also uses the terms "mechanical keyboard", "mechanical thumboard", "physical keyboard", and "physical thumboard" interchangeably, except where otherwise noted. The word "thumboard" can also be spelled "thumbboard", with two "b"s, or "thumb-board".

There have been a few prior attempts to allow thumb-typing on handheld electronic devices, including, but not necessarily limited to, the following software: SPB's Full Screen Keyboard, Kilmist's Keyboard XL, Previsionary Inc.'s Typango, Indigo Softworx's Thumboard 1.1, and Fortune Fountain Ltd's Dialkey and other virtual keyboards. These solutions use QWERTY keyboard layouts (though not necessarily standard straight-rowed QWERTY keyboard layouts), and their virtual keyboard images go away when not in use, so their appearances, and the appearances of the devices they run on, can be more consumer friendly than devices with attached mechanical thumboards. However, none of the prior virtual thumboard solutions come very close to allowing users to type text as fast and comfortably as users can type on today's highly regarded handheld devices with mechanical thumboards, especially for people with above average hand size. New users, in particular, experience excessive errors or awkwardness when they pick up the device for the first time and start typing, compared to typing on a device with a mechanical thumboard. For mainstream consumers, that last point is typically more relevant. People will often get better at operating a device as they practice using it repeatedly over time, even if it is hard to use initially. However, if the first impression is bad and the experience fails to live up to users' expectations immediately, mass-market consumer adoption is unlikely. Another downside to these full-screen virtual thumb-boards is that, in an attempt to maximize accuracy, they generally fill the device screen with the keyboard layout from top to bottom, as well as side-to-side allowing users to see just a few words at a time of the text the user is typing, and leaving no room to see the larger context of the Web page or application into which the user is typing.

Some examples of typical reactions from people who evaluated prior virtual thumboards are as follows. Julio Ortiz wrote in a review on PDALive.com, "Don't expect to type on Typango (or any of the full screen keyboards for that matter) as fast as you do on a regular keyboard or thumboard." Young Joo wrote on AximSite.com (a site devoted to Dell's Axim PocketPCs), "One of the downside of SPB FSK was the accuracy. I always had misspelled words." In a review on the PDAGeek section of Geek.com, Joel Evans wrote, " . . . I still find myself wanting either a full-blown hardware keyboard or a clip-on [mechanical] thumbboard." Prior virtual thumbboards simply have not lived up to user expectations, which have been formed in part by users' successful experience with mechanical thumbboards. But the mechanical thumbboards come with the negative side effects outlined above (e.g. size, weight, cost, extra breakable parts, intimidating look, etc).

Recently some companies have made a virtual thumbboard for mid-size tablet PCs. One aspect to note is that they generally have to lay out the keys in big curvy "dials"—this is on a large display (e.g. 7" diagonal). Typing of such curvy layouts tends to be very non-intuitive as it usually requires a hunt and peck typing method, as if one has little or no experience typing on a QWERTY keyboard. One cause for this is that the keys are not where the brain expects them to be; i.e. in straight rows. For example, the T key may appear about where the B key appears on a normal keyboard, relative to the upper right or left corners of the keyboard. In addition, the large size of such keyboards typically makes it physically difficult to reach and activate each key. And when such devices additionally use touch-screens that require excessive finger activation force (as is common), then users often have to bend their thumbs awkwardly to get their thumbnails onto the target to apply sufficient force, which is quite uncomfortable compared to using thumb-pads. The large, counter-intuitive layout of such keys is likely an attempt to improve accuracy, which seems to suggest that the developers of those large curvy keyboards were not able to achieve high thumb-typing accuracy on smaller, more normal looking keyboard layouts. Moreover, typically, the graphic targets of the keys extend all the way out to the neighboring keys' graphic targets: This is not particularly problematic if very large graphic targets are used for the keys; however, it simply does not work if the keys must be made small enough to fit a full Qwerty keyboard on a pocket-size device (e.g., without limitation, on a display that is 5"-diagonal or smaller), because users will often inadvertently click a little outside of an intended graphic target area when the target area is small and when the user is clicking with a thumb, as discussed further below.

For example, Microsoft and some device partners (including Samsung) recently introduced a relatively large hand-held tablet computer, which they are calling an "ultra-mobile PC" or "UMPC", that includes a large, non-standard, semi-circular, split keyboard upon which users can try to thumb-type. The keyboard software, named "DialKeys" was designed by a company named Fortune Fountain Ltd. Tests show that thumb-typing on that big tablet and the oddly shaped virtual thumb-board is much more awkward than thumb-typing on a good mechanical thumb-board (such as those on a Blackberry), which may be why the device also includes alternative text-input mechanisms and a stylus. In any case, the UMPCs are roughly 9" wide with 7"-diagonal displays, far from "pocket-size".

In view of the foregoing, there is a need for a virtual thumboard for small, handheld electronic devices that is easy to use and allows the user to type quickly, accurately, and comfortably for functions such as, but not limited to typing, information searching, and user interface (UI) controls. Furthermore, enabling fast, accurate, and comfortable thumb-typing on a virtual thumb-board on a pocket-size device in turn enables a new class of thumb-optimized touch-screen user interfaces.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 shows an experiment with no data delay.

FIG. 3 shows an experiment with a 0.04 second data delay.

FIG. 4 shows an experiment with a 0.06 second data delay.

FIG. 5 shows an experiment with a 0.08 second data delay.

FIG. 6 shows an experiment with a 0.10 second data delay, and

FIG. 7 shows an experiment with a 0.12 second data delay;

FIG. 9-A and FIG. 9-B illustrate an exemplary device with a virtual keyboard with active areas and graphic target areas that work well for a wide range of people, in accordance with an embodiment of the present invention. FIG. 9-A shows graphical target areas, active areas, and touch points from a user, and FIG. 9-B shows only the graphical target areas of the device;

In FIG. 10-A, the user is using a thumb to click on one of a plurality of graphic symbols (i.e. an "icon"). FIG. 10-B shows a screen with another set of icons. FIG. 10-C shows a screen with a text box and a virtual keyboard, and FIG. 10-D shows the screen from the result of the user's search;

FIG. 11-A shows a screen with multiple icons indicating search options. FIG. 11-B shows a screen with a text-edit box and a virtual keyboard, and FIG. 11-C shows a results screen;

FIG. 12-A illustrates an exemplary user interface using a thumb-optimized virtual wheel control, in accordance with an embodiment of the present invention;

FIG. 12-B illustrates an exemplary user interface using a thumb-optimized virtual wheel control, in accordance with an embodiment of the present invention a preferred embodiment of the present invention.

Figure 1:
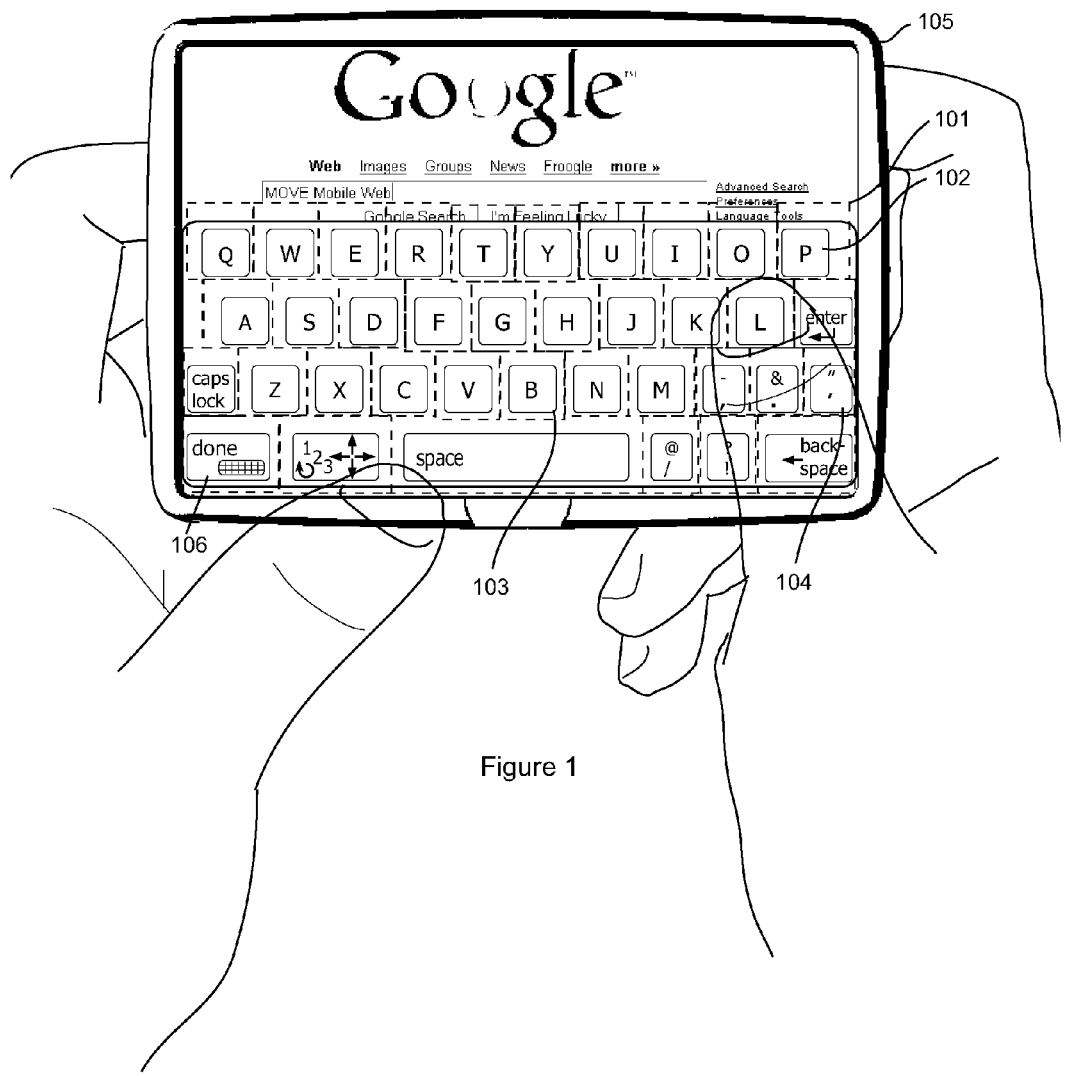
FIG. 1 shows an exemplary hand-held, electronic device with an exemplary virtual keyboard, in accordance with an embodiment of the present invention.

Unless otherwise indicated illustrations in the figures are not necessarily drawn to scale.

SUMMARY OF THE INVENTION

To achieve the forgoing and other objects and in accordance with the purpose of the invention, a variety of techniques of implementing a thumb-optimized touch-screen user interface are described.

In one embodiment of the present invention, a hand-held device having touch-screen display capable of implementing a virtual keyboard for inputting keystrokes by a user is provided that includes a touch-screen contact detection unit, the contact detection unit being configured to output an engagement signal that indicates the touch-screen has been engaged with at least a predetermined engagement force level, the contact detection unit being further configured to output positioning information operable to at least locate the approximate coordinates of the touch-screen where the engagement force was applied; an engagement timer, the engagement timer being configured to count and output the amount of time elapsed from when the engagement signal becomes active after detecting the sufficient engagement force; and a touch-screen engagement delay filtering unit, the touch-screen engagement delay filtering unit being configured to register an engagement event if the engagement signal continues to be active after a sufficient engagement delay time has occurred for the touch-screen positioning information to be useful in registering intended engagement of the touch-screen.

Another embodiment of the present invention is a handheld device having touch-screen display capable of implementing a virtual keyboard user interface for inputting keystrokes by a user that includes a touch-screen contact detection unit, the contact detection unit being configured to output an engagement signal that indicates the touch-screen has been engaged with at least a predetermined engagement force level, the contact detection unit being further configured to output positioning information operable to at least locate the approximate coordinates of the touch-screen where the engagement force was applied; and a virtual keyboard displayed by the touch-screen display wherein at least one virtual selectable item of the displayed virtual keyboard is configured to comprise a graphic target area and an active area, the active area being configured to extend beyond the graphic target area such that at least one of the active areas includes touch-screen points that, with respect to the graphic target area of the corresponding virtual selectable item, are either directly above, to the left, or to the right, or below the respective side of the corresponding graphic target area, the device being configured to register touch engagement of particular virtual selectable item of the virtual keyboard if the touch-screen contact detection unit signals touch-screen engagement having corresponding positioning information that is located within the graphic target area or the active area.

Yet another embodiment of the present invention is a touch-screen-based user interface (UI) System on a handheld device, the UI includes a virtual wheel control displayed by the touch-screen display, the virtual wheel control being configured to comprise a graphic target area and an active area, the active area being configured to extend beyond the graphic target area such that at least one of the active areas includes touch-screen points that, with respect to the graphic target area of the virtual wheel control, are either directly above, to the left, or to the right, or below the respective side of the virtual wheel control area, the device being configured to register touch engagement of the virtual wheel control and is operable to generate at least some of the corresponding signals that mimic the expected behavior of a physical wheel control hardware device.

Still another embodiment of the present invention is a thumb-driven virtual user interface (UI) system for information searching, which includes a first display area displaying a first set of virtual selectable items; a second display area displaying a second set of virtual selectable items, the second display area being displayed in response to a user selecting one of the first set of virtual selectable items; a third display area displaying the thumb-optimized virtual keyboard and a query box into which the user can type search query text by engaging the appropriate virtual keys of says virtual keyboard; the third display area being displayed in response to a user selecting one of the second set of virtual selectable items; and, a fourth display area that displays at least some search results, the fourth display being displayed in response to a user engaging the virtual keys.

An alternative embodiment of the foregoing embodiment is a thumb-driven virtual User Interface (UI) System for Information Searching that includes a first display area displaying a first set of virtual selectable items; a second display area displaying the thumb-optimized virtual keyboard and a query box into which the user can type search query text by engaging the appropriate virtual keys of says virtual keyboard; the second display area being displayed in response to a user selecting one of the first set of virtual selectable items; and a third display area that displays at least some search results, the third display being displayed in response to a user engaging the virtual keys.

Still another embodiment of the present invention is a thumb-driven virtual user interface system for selecting virtual selectable items on a Web page displayed on a touch-screen display of a portable device, in which a thumb-optimized virtual wheel control is used to roll the Web page focus back or forth through the selectable items, and in which the user can use his or her thumb to press on a virtual selectable item to select the desired item to focus on.

Means for, and steps for implementing the above functions are also provided in other embodiments of the present invention.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognized a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternatives embodiments do not necessarily imply that the two are mutually exclusive.

To overcome some if not all the foregoing issues with conventional approaches, an aspect of the present invention is to provide a virtual thumb-board solution that fits on a pocket-size device or even palm-size device and uses the standard QWERTY layout with straight rows of keys, which is achieved while making the virtual thumb-board accurate and comfortable.

It is to be understood that any exact measurements/dimensions/values or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

The present invention will now be described in detail with reference to embodiments thereof as illustrated in the accompanying drawings.

One aspect of the present invention is to provide fast, comfortable typing on a virtual keyboard. Another aspect is generally ensuring that the device responds appropriately to "clicks" of the user's finger on the touch-screen, whether the user is typing, clicking on a link on a Web page, or clicking the touch-screen for some other reason. For example, without limitation, to optimize the user experience, some embodiments of the present invention respond at different times to a finger pressing on or lifting off the touch-screen depending on whether the user is typing a key on a virtual keyboard or clicking on a Web page link. The terms "finger" or "fingers" when referred to are meant to include thumb or thumbs (not just the non-thumb fingers), unless otherwise stated.

Embodiments of the present invention provide a class of pocket-size mobile devices that allow exceptional mobile Web access, information searching, and optionally features such as, but not limited to, email, instant messaging, voice communication, and eReading or eBooks, while being small, affordable, and consumer-friendly. Preferred embodiments would allow full operation including, without limitation, easy Web navigation as well as fast, comfortable typing without requiring a mechanical keyboard or a stylus, which, in many applications, enables devices to be smaller, lighter, thinner, less expensive, easier to localize for different countries, more consumer-friendly looking, more reliable, and easier to hold than devices that have an embedded or attached mechanical keyboard with dozens of physical buttons. An additional aspect of this is to enable devices to be quicker and more comfortable to operate than devices that require the use of a stylus, especially when typing.

Herein it should be noted that when a user presses a finger or thumb on a touch screen, it can cover a relatively large area. For example, without limitation, a given person might press down and cover an area with their finger that is roughly equivalent to a circle with a 16 mm diameter. Many touch screen systems can determine the approximate center or "center of gravity" of that finger press, resulting in the device interpreting the key press as a click on a small dot or point at a specific X/Y coordinate on the display. When referring to a user pressing or clicking at a "point" or "spot" or "location" on a touch screen with their finger (which could be a thumb), it is generally meant that center or "center of gravity" of the finger press, at a given moment during the press.

As will be discussed in some detail below, embodiments of the present invention enable fast comfortable thumb-typing, without a physical keyboard, by integrating some or all of the following four elements. A first of these elements is proper activation force. The touch screen activation force should be under a certain threshold amount, for example, without limitation, under 80 grams, when using a finger to type text on the virtual keyboard, for reasons discussed below. A second element is proper data delay. In these embodiments, the device is configured to ignore a certain time range (e.g. at least the first 0.05 second, and no more than the first 0.19 second) of data sent from the touch-screen when the user's finger (particularly a thumb) begins touching the touch-screen at or above the activation-force level, while typing text on the virtual keyboard. This type of delay in using the data is referred to as the "data delay". Preferred embodiments use data delays between 0.08 second and 0.14 second, inclusive, for reasons discussed below. Note that this data delay is separate from "debouncing" that may be done with switches and touch-screens to disregard very brief "bouncing" of a finger on a component, as explained further below. Whether or not a finger bounces, the initial "touch point" location is often not a reliable indicator of where the user is attempting to press, especially when the user is pressing with a thumb, but waiting until a "proper data delay" period has passed allows the thumb to reach a "settle point" that is a significantly more reliable indicator of where the user is attempting to press.

A third element integrated into some preferred embodiments of the present invention is proper sizing and placement of active areas of the virtual keyboard keys. The activation area of a given key, also referred to as the "active area", is the area on the touch screen within which a user must press to "type" that key. When "thumb-optimizing" keys, the key's activation area can be, and generally is, larger than the graphical target shape that shows where the user should type, so that if the user's thumb contacts the device slightly outside the displayed graphic target area, which can be a common occurrence when using thumbs, but within the slightly larger active area corresponding to that graphic target, the device will "forgive" the "miss". For example, without limitation, in the embodiment illustrated by way of example in FIG. 1, an active area 101 for a "P" key is significantly larger than a graphical rounded-corner square target area 102 showing where the user should attempt to press their finger to type the letter "P". In this example, if the user's thumb contacts the screen within active area 101, ideally after accounting for the "proper data delay" discussed above, the "P" key will be typed. Patterns have been discovered in the way users tend to "miss" graphic targets in somewhat predictable ways depending on where on the display the graphic target is displayed, in large part because of the physical behavior shared by most human thumbs. By "biasing" the active area borders of virtual keyboard keys relative to their graphic target areas in different ways depending on the location of the graphic targets on the display, the present embodiment is able to minimize typing errors while displaying a full, standard-looking QWERTY keyboard with straight even rows of keys on a pocket-size device, especially when combined with the proper data delay discussed above.

Embodiments that "thumb-optimize" virtual keyboards on pocket-size devices for a wide range of people, including people with above average size hands, are discussed below. In addition, the preferred embodiment applies these thumb-optimization lessons to other types of virtual selectable items such as, but not limited to, a button, check box field, number-pad key, etc. One embodiment of particular note is a "thumb-optimized" virtual wheel displayed as part of a larger user interface sharing the same touch-screen. Such embodiments are discussed below. For convenience, a graphical target area is sometimes referred to as a "graphical square"; however, it is understood that the shape could actually be a rectangle, circle, or other shape. It is merely a target for where the user should try to press their thumb down. This may also be referred to this as the "graphic target area", "graphical target area", "target area", "graphical target, "graphic target", or "target graphic", and related terms.

As a consequence of the active area considerations covered in the embodiments below, preferred embodiments comprise active areas for virtual alphabet keys, the keys on a virtual keyboard that users type the most, which are generally at least 9 mm wide and tall. Note that this places a practical lower bound on the overall width of the virtual keyboard and the device itself, if the virtual keyboard has a standard set of alphabetic keys for a given language. For example, without limitation, for an English QWERTY keyboard, the top "Q" through "P" line consists of at least 10 keys corresponding to the letters Q, W, E, R, T, Y, U, I, O, and P, as shown by way of example in FIG. 1. If each of those keys has an active area that is at least 9 mm wide, the 10 keys together form a line that is at least 90 mm wide (3.54 inches). In this example, 90 mm would become a lower bound on the overall virtual keyboard width and device width, if a standard English QWERTY keyboard is being used.

A fourth element implemented in embodiments of the present invention places an upper bound on the overall virtual keyboard width and device width to determine the proper overall width of the virtual keyboard and the device. In the preferred embodiment, the overall size of the virtual keyboard visible at any given moment while the user is thumb-typing on the visual keyboard is no more than 130 mm wide. If the keyboard is split into two parts (e.g. to display on a larger device, with half the virtual keyboard near the left of the display and the other half near the right, the half being for the left thumb and the right half for the right thumb) then each part is preferably no more than 65 mm wide. If a continuous keyboard is used (i.e. not a split keyboard), the overall width of the part of the device the user holds in their hands while thumb-typing is preferably no more than 135 mm. Otherwise a large number of users will have a hard time reaching the center of the keyboard with their thumbs while holding the device in a comfortable grip. Within the limits outlined above, some preferred embodiments may implement the following parameters: an activation force of 30-55 grams when pressed by a finger, a data delay of 0.08-0.14 seconds, virtual key active areas for the alphabetic keys at least 10 mm wide and at least 10 mm tall (preferably with the active area of each alphabetic key extending at least 1 mm above its graphic target area and extending at least 1 mm left or right toward the closest vertical display edge), one continuous virtual keyboard (not split) with an overall width of 100 mm-115 mm, and an overall device width of 110 mm-130 mm. Most of these values were determined by way of experiments in development of the present invention. Reasons for certain ranges of values are explained below.

When "overall device width" or simply "device width" are referred to, it should be understood that the given device width dimensions are meant to apply to the part of the device that the user holds while thumb-typing, unless otherwise noted. They are not meant to include antennas or other elements of the device that do not affect the width the user feels in their hands while holding the device while thumb-typing.

When reference is made to a device being "small" or "pocket-size", the reference is to devices that fit easily into a typical adult male's pants pocket, making it far more likely that consumers will frequently carry such devices, compared to tablets or laptops that do not easily fit in a pocket. Preferred embodiments would constrain the device size to "palm-size", for example, without limitation, similar to the size of Palm Vx or Compaq iPaq PDAs, or smaller, so the device generally fits easily within a typical shirt pocket. In this context, "palm-size" is just a subset of "pocket-size". However, alternate embodiments may be larger.

Embodiments of the present invention can also include additional features. For example, without limitation, one useful extra feature is having the device play a short sound each time the user clicks on a virtual key or giving the user the option to enable or disable such a feature. Embodiments of the present invention enable accurate and comfortable thumb-typing on the touch-screens of pocket-size devices despite the lack of tactile feedback. Whether the user wants to use a thumb, index finger, or stylus for given tasks, and whether the user is clicking keyboard keys, Web browser links, or certain other types of selectable items, it can be comforting to hear a short audible confirmation that the device has detected the click. Such audible feedback, if any, should occur after a proper delay (i.e. not the instant the finger contacts the surface) to reflect the natural delay between initial contact and key-typing that users experience and expect from mechanical keyboards.

FIG. 1 shows an exemplary hand-held, electronic device 105 with an exemplary virtual keyboard, in accordance with an embodiment of the present invention. The embodiment illustrated in FIG. 1 comprises a virtual keyboard of about 105 mm from the left of a done key 106 to the right of a quote key 104. Some embodiments may have some non-alphabetic keys, especially near the display edges, smaller than the main alphabetic keys "A" through "Z". For example, without limitation, in the present embodiment, a quote key 104 is narrower than the alphabetic keys. Some embodiments may also have keys that are larger than the main alphabetic keys such as, but not limited to a done key 106 in the present embodiment. Device 105 preferably has a clean, simple form-factor with slightly tapered sides that is comfortable in users' hands.

As previously described, the active areas for many of the keys in the present embodiment are larger than the graphical target areas for their corresponding keys. For example, without limitation, active area 101 for the "P" key is larger than graphical target area 102 for the "P" key. Another example, without limitation, is an active area 103 for the "B" key.

The size-related elements discussed for the present embodiment are contemplated to generally apply to devices designed primarily for the hands of adult users or older teens. Younger teens are also likely to find these dimensions to be suitable. Embodiments created mainly for younger children, for example, without limitation, children under the age of 15, may have smaller dimensions.

The "thumb-optimization" elements outlined above will now be discussed in more detail.

Proper Activation Force:

Many touch screens for mobile devices are optimized for use with a stylus. Typically when a person presses a stylus on these touch screens with about 50 grams of force, a fairly typical and comfortable activation force level when tapping or pressing on a touch-screen with a stylus, that force is concentrated on the small area of the touch-screen touched by the tip of the stylus, an area often only about 1 millimeter in radius, resulting in a high force-per-area. To avoid too many unintentional "clicks" from occurring any time the user merely brushes, touches, or rests the stylus or their palm on the touch-screen, the touch-screen systems are often made to only activate (i.e. recognize a click) when the activation force exceeds a relatively high minimum activation force per area—such as, without limitation, about 50 grams of force from the tip of a plastic stylus with a 1 mm-radius hemispherical tip. When a finger is pressed on a touch screen, the finger's area of contact is typically much larger than the contact area of a stylus tip. For example, a typical adult finger's area of contact can have a diameter on the order of 10 mm-20 mm, sometimes larger. Since the contact area for the finger is much larger than the contact are for a stylus, a finger pressed with about 50 grams of force will produce a much lower force-per-area than a stylus pressed with the same amount of force. As a consequence, on many touch-screens that are optimized for use with a stylus, when a user uses a finger instead of a stylus, the user must press extra hard to exceed the systems' relatively high minimum activation force per area, often over 100 grams of force for activation by finger, for touch-screens that might only require about 50 grams of activation force with a stylus. The minimum activation force usually doesn't scale proportionately with the area. But in general, much more force is required when using a finger than when using a stylus. Some touch-screen makers use a ⅝ inch diameter silicon finger to represent a typical finger and define "finger activation force" as the force required when using this silicon finger on the touch-screen. The prior "finger activation force" definition applies as well in the present example. The phrases "engagement force" and "activation force" are used interchangeably in this document. And unless otherwise noted, the phrase "engagement force" in this document means "finger engagement force" (as opposed to stylus engagement force).

Requiring an activation force over 100 grams, nearly a quarter pound, when using fingers may be acceptable for applications where the user only needs to press a few button images every once in a while. When trying to quickly type text on a virtual keyboard, having to repeatedly press the touch-screen with that much force can become very annoying, since the user will often fail to press hard enough to activate a key resulting in excessive errors, or the user will instinctively slow their typing to carefully and forcefully press each key, which can also become tedious even if a user does not fully recognize that the excessive force requirement is contributing to slowing their typing and forcing them to concentrate harder. To optimize the system for typing with fingers on a virtual keyboard, it is more optimal to allow for a touch-screen activation force less than 80 grams, and preferably less than 55 grams, when using fingers instead of a stylus. These exemplary thresholds were derived from experiments, in development of the present invention, with touch-screens having various activation force levels. It should be appreciated that the specific thresholds noted above are subjective and depend on the particular application; however, it was generally observed that people find it significantly more comfortable when clicking virtual items on a touch-screen with a thumb or finger when the finger activation force is under 80 grams than when the finger activation force is near or above 100 grams. The experiments further indicate that a finger activation force between 30 and 55 grams resulted in requiring enough finger or thumb force to avoid most accidental activations from barely brushing the screen, but not so much thumb or finger force that it becomes uncomfortable. Note that having an activation force well above zero is advantageous, to avoid inadvertent activation when the user merely brushes the touch screen or rests a thumb on the touch-screen. Some touch-screens, such as, but not limited to, some capacitive touch screens, can be activated with little or no force.

Proper Data Delay:

With most mobile devices that use virtual keyboards for text input, as soon as the user presses on the touch screen with a force exceeding the activation force level (as discussed above), data from the touch-screen indicating where the user is touching starts streaming to the device's central processor, and the device immediately interprets that data and immediately responds by "typing" the key at the given location, if the location is on a selectable item. Selectable items are items on the touch screen that the user may select by touching or "clicking" them. However, if a user tries thumb-typing on a full virtual keyboard using a hand-held pocket-size device's touch screen, this immediate response will contribute to many typing errors. This is largely because when a user types with their thumbs, their thumbs can twist, or pronate, and the edge of the thumb can initially touch down fairly far off center from the spot where the user is trying to type. The problem is compounded by the fact that thumb size and shape varies considerably among people. Other factors contribute to errors as well, such as, but not limited to, slight visual parallax, which is a gap between where the user's eye indicates where the center of the finger is about to click and the spot that is actually under the center of that finger. Users are much more accurate when using an index finger rather than when using a thumb, even though the parallax is about the same for a finger and a thumb. The thumb's unique pronation and shape characteristics appear to be the biggest contributors to thumb-typing errors on virtual keyboards on pocket-sized devices.

Figure 2:
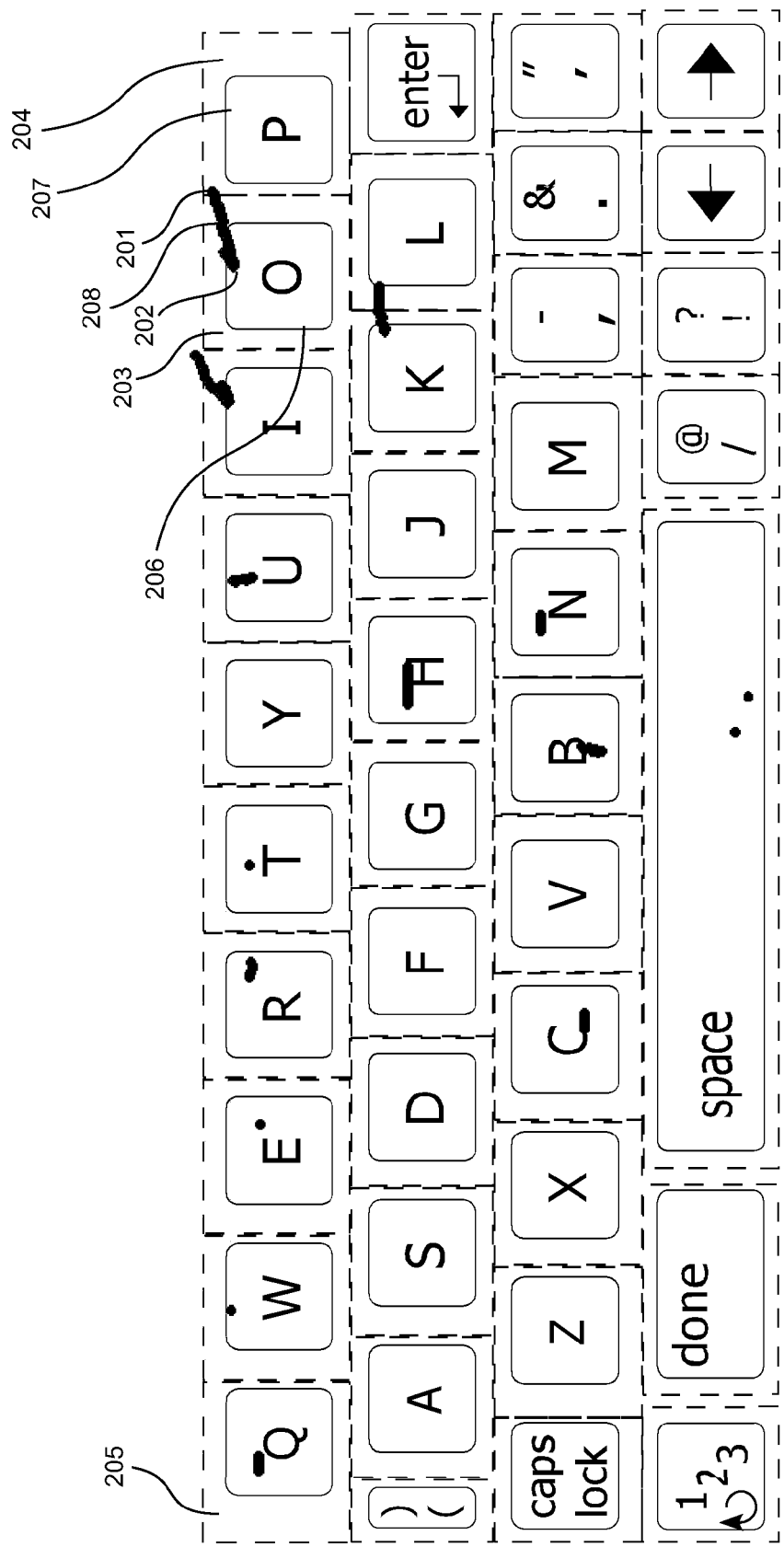
FIGS. 2 through 7 show enlarged keyboard images showing exemplary iterations of a thumb-typing experiment using different settings for data delay.
Figure 3:
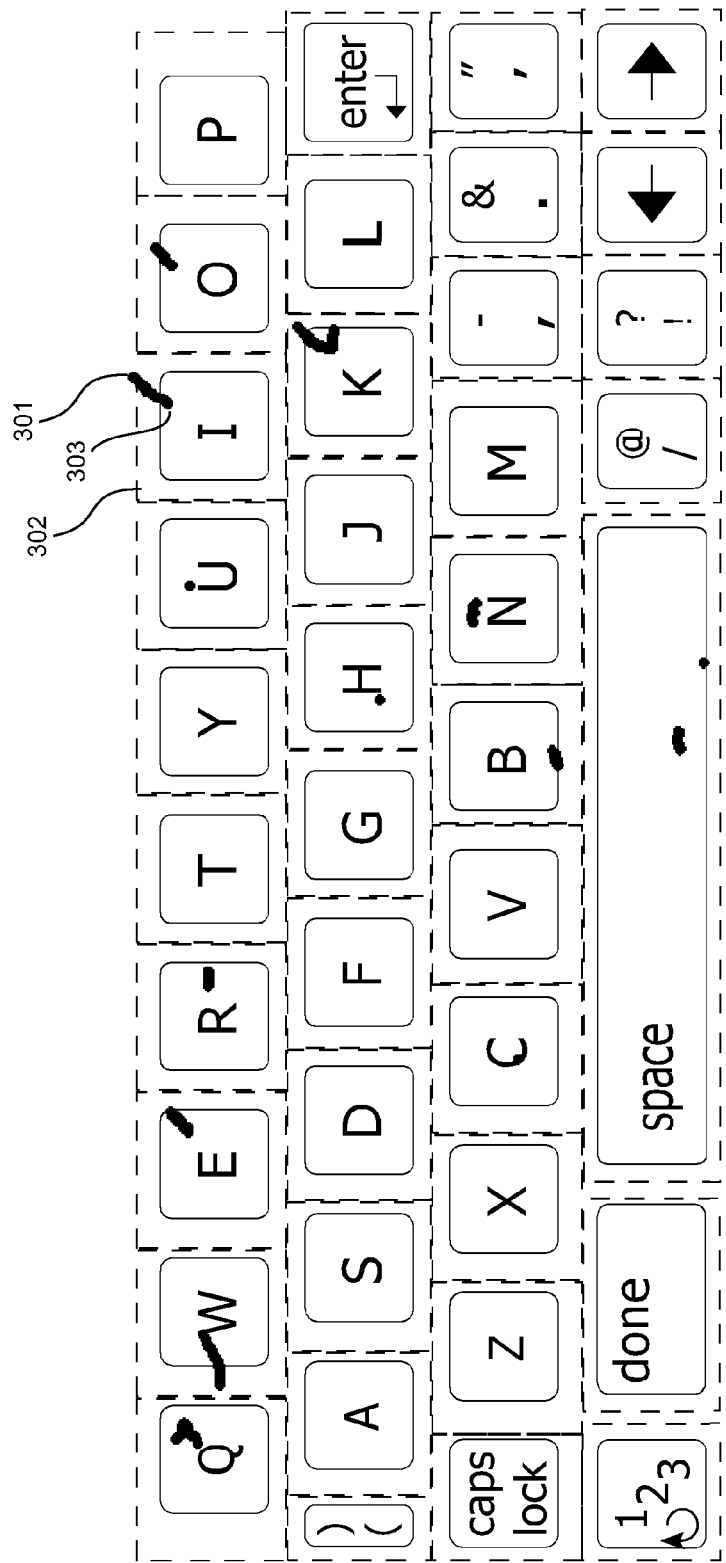
Figure 4:
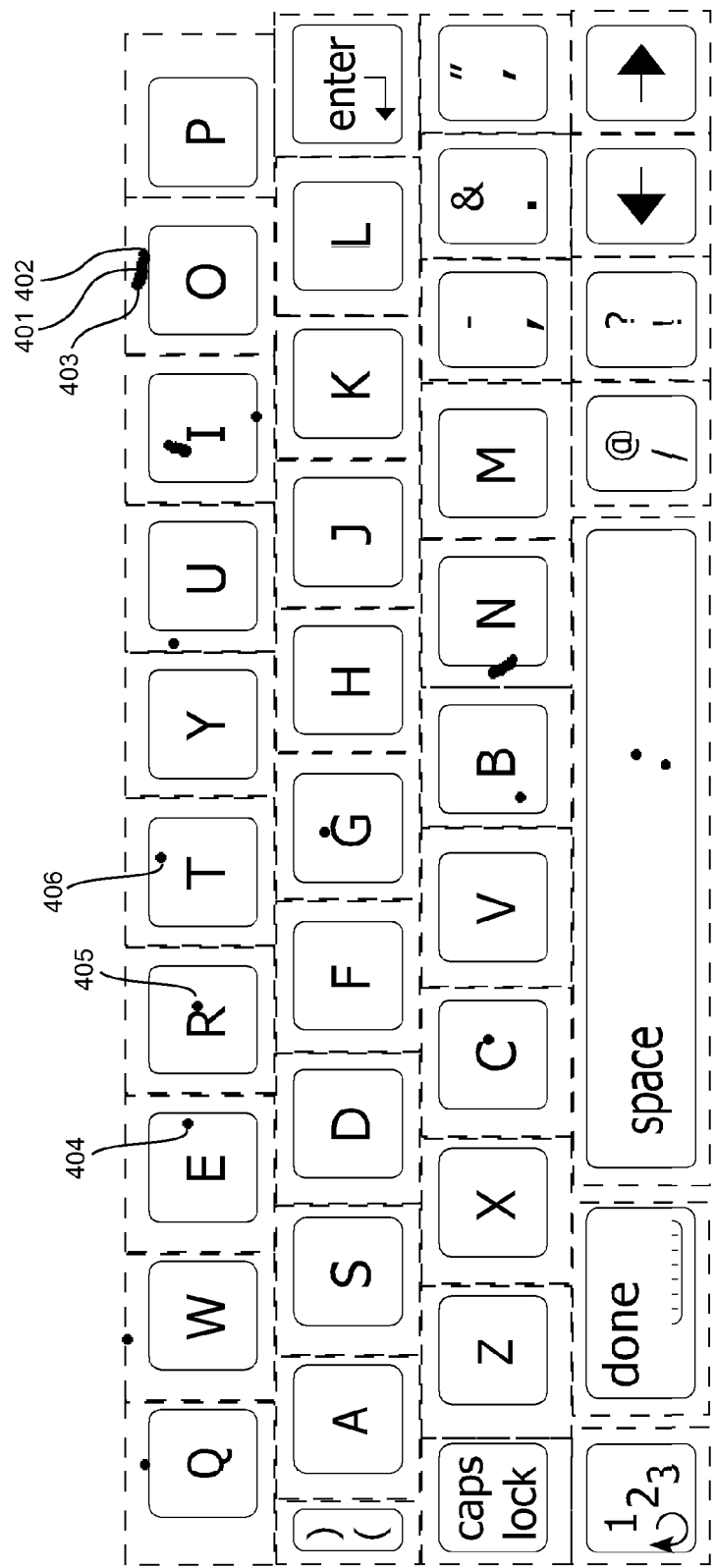
Figure 5:
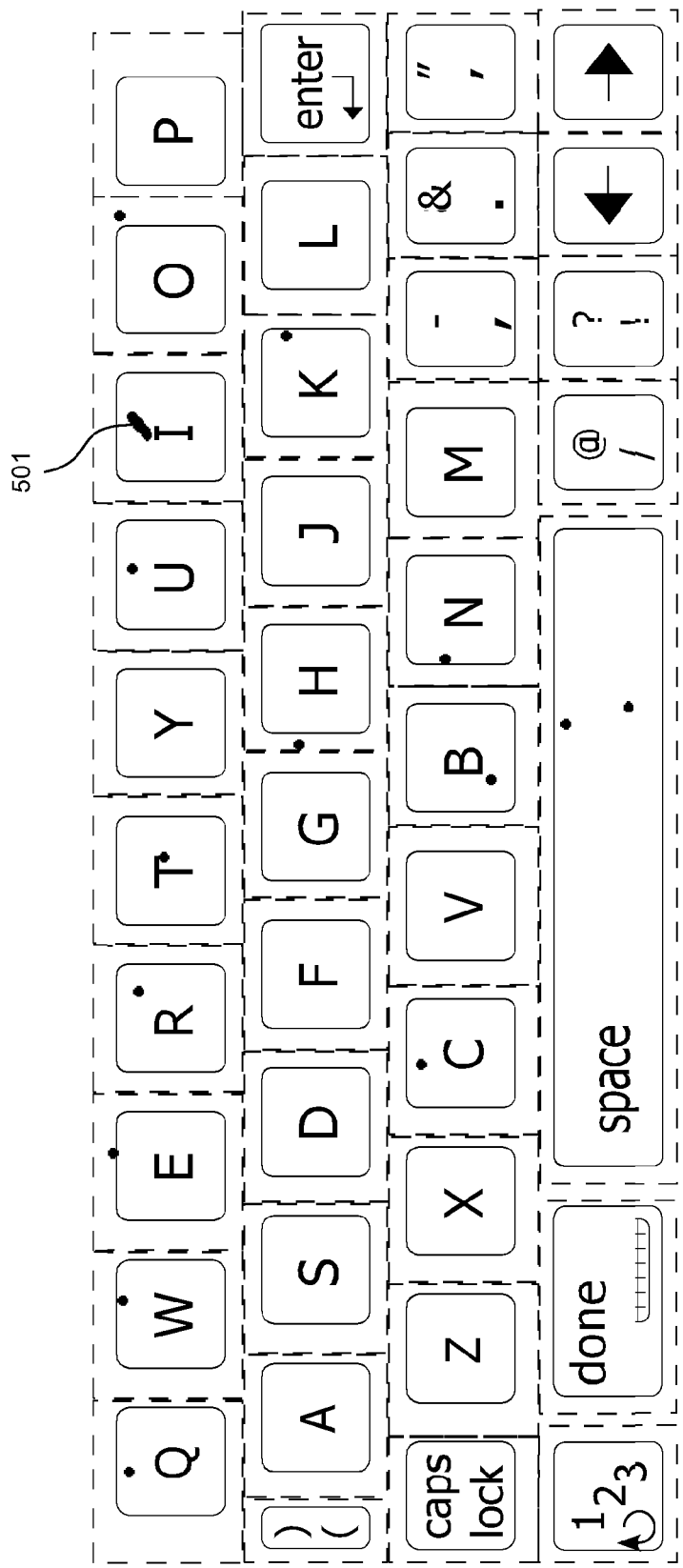
Figure 6:
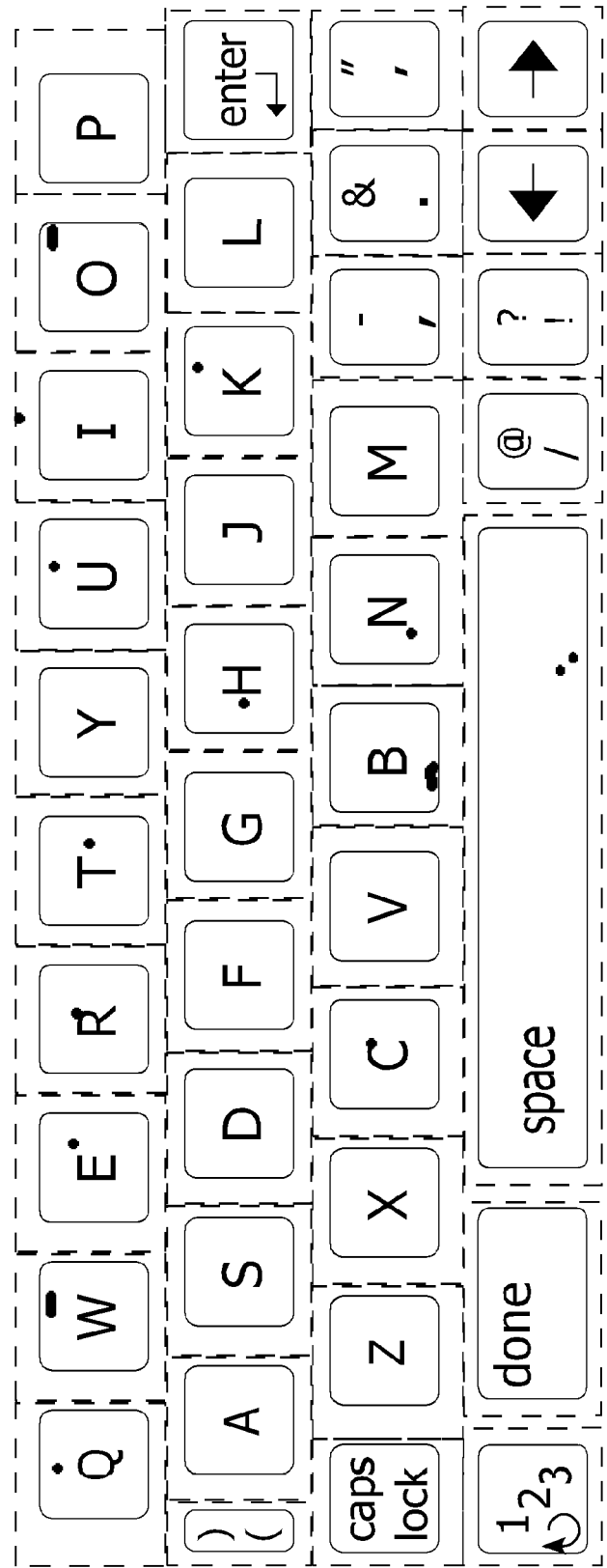
Figure 7:
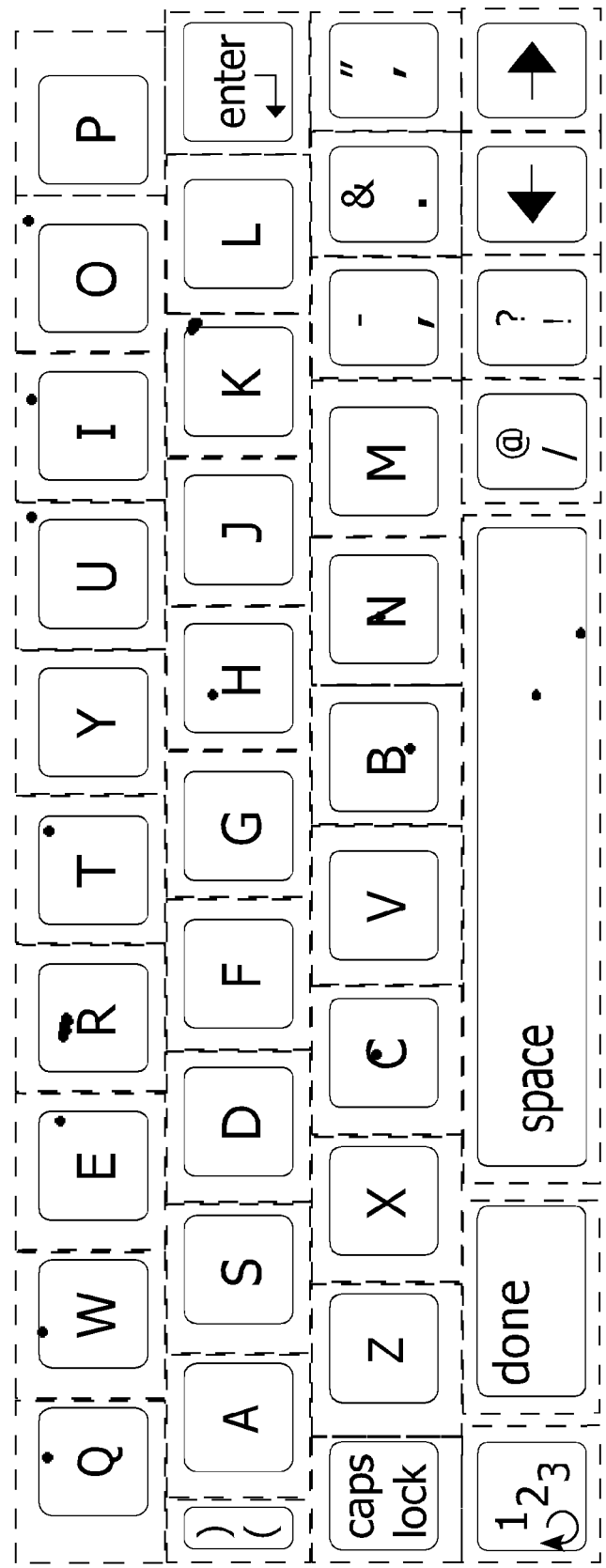

FIGS. 2 through 7 show enlarged keyboard images showing exemplary iterations of a thumb-typing experiment created and carried out by the applicant using different settings for data delay, which revealed the need for a data delay to reduce errors on virtual thumb-boards and helped identify preferred data delay ranges. FIG. 2 shows an experiment with no data delay. FIG. 3 shows an experiment with a 0.04 second data delay. FIG. 4 shows an experiment with a 0.06 second data delay. FIG. 5 shows an experiment with a 0.08 second data delay. FIG. 6 shows an experiment with a 0.10 second data delay, and FIG. 7 shows an experiment with a 0.12 second data delay. FIGS. 2 through 7 are actual recordings of data from a person thumb-typing on a working prototype with a virtual thumb-board similar in size and layout to that shown in FIG. 1. In the experiment illustrated in each of FIGS. 2 through 7, each rough dot or line records the center of gravity of a thumb-press for brief period of time, as the user attempted to type each letter in the phrase "the quick brown". The experiments involved much more typing, however, for clarity we only show these representative snippets from these data delay settings. For each thumb press, data was tracked starting after the figure's corresponding data delay period, which itself started only when the thumb pressed down with enough force to activate the touch-screen (i.e. exceeded the touch-screen's activation force level); and then data was tracked for that thumb-press until the user lifted their thumb as they continued to type additional letters.

In the example illustrated in FIG. 2, given that there is no data delay the software driver can pay attention to all data from the touch screen rather than ignoring data for a short period of time as in later examples. When the user thumb-types the phrase "the quick brown" and reaches the letter "O", the user's thumb initially touches down at a touch point 201 that the touch-screen registered as just outside an active area 203 corresponding to the letter "O" and inside an active area 204 corresponding to the letter "P". In the present example, a short time later (about 0.08 sec) the user's thumb has settled down to a settle point 202, within active area 203. Notice that rectangular active area 203 in this example extends well beyond a rounded-square graphical target area 206 for the "O" key—as is the case with the other keys on this keyboard, including, but not limited to an active area 205 corresponding to the letter "Q" and active area 204 corresponding to the letter "P". In this example, the device was set to respond immediately when the user pressed with a force exceeding the activation force level, so the device incorrectly recorded the letter "P" as being typed instead of "O". That is, the device assumed touch point 201 was the point the user intended to press. This error appears to be primarily caused by the fact that when a user holds a device like the one shown by way of example in FIG. 1 and uses the right thumb to type letters near the upper right of the virtual keyboard, the thumb tends to twist, or "pronate", and touch down along the right edge of the right thumb, to the upper-right of the spot the user is trying to type. This example shows a similar error when the user tried to type the "I" key and the "K" key with initial contacts being recorded outside the active area of the "I" key and the "K" key. Different typists using different keyboards will produce errors of this kind on different keys at different times. When errors like these appear often, thumb-typing becomes slow and uncomfortable, largely because the user has to back up and correct errors too often.

Fortunately, the thumb continues settling after that initial contact. By about 0.05 second after the thumb initially touches down with a force exceeding the activation force level, the thumb print will generally settle down so its "center of gravity" presses a spot that the device can recognize as being within the active area of the key the user intended to type—if the active area is properly sized and place in accordance with the present invention, as discussed in this document. For example, in the experiment recorded in FIG. 2, when the user typed the letter "O", the thumb was initially recorded as pressing touch point 201 outside of active area 203, as noted above. However, by about 0.05 second later, the thumb had settled down enough so that the touch-screen recognized it as pressing a point 208 that is well within active area 203 of the "O" key. By about 0.08 second after the thumb initially touched down with a force exceeding the activation force level, the thumb had settled a bit further and was well within active area 203 and, in this case, even within graphical target area 206 corresponding to the "O" key. Experiments like this, suggest that one could eliminate many thumb-typing errors by configuring the device to ignore the first few hundredths of a second of data from the touch-screen after the activation force had been exceeded rather than having the device immediately interpret the contact position. By introducing this "data delay", the thumb print has enough time to settle down closer to the position the user is actually trying to press. By experimenting with different data delays, a range that worked well was found.

As discussed above, having no data delay (i.e. a data delay of 0.0 second) results in too many thumb-typing errors for fast and comfortable typing. FIG. 3 illustrates an experiment that used a data delay of 0.04 second so the experiment ignored the first 0.04 seconds after the user's thumb initially touches down with the required force then tracks the position where the thumb presses until the thumb lifts. This still proved to be too small of a data delay to avoid a significant number of thumb-typing errors. For clarity, FIG. 3 illustrates an error that occurred when the user got to the letter "I" while typing the short phrase "the quick brown" in one experiment. Similar additional errors quickly appeared as users typed more text, in this and other experiments with the data delay set to 0.04 second; though, fewer errors than occurred with no data delay. Note that in the experiment illustrated in FIG. 3, when the user tried typing the letter "I", the device started recording the key press 0.04 second after the thumb pressed down with a force exceeding the activation force level. But at that moment, the contact area of the thumb was still centered at a touch point 301 just above an active area 302 corresponding to the "I" key on the virtual keyboard. Since the device was configured in this experiment to interpret the key press just 0.04 second after the thumb exceeded the activation level, it failed to type the letter "I". Note that a short time later, the thumb settled down further so that its contact area was a settle point 303 centered well within active area 303 of the "I" key. This suggested that a slightly longer data delay could help reduce the kind of thumb-typing errors represented by this "I" key.

FIG. 4 illustrates an experiment that used a data delay of 0.06 second. That is, the data is recorded starting 0.06 second after the thumb initially presses with a force exceeding the activation force level rather than starting the recording immediately after the thumb exceeds the activation force level then the movement of the thumb is tracked until the thumb lifts. As can be seen by the very short irregular thick lines such, but not limited to, a line 401 representing the thumb press on the "O" key, this delay gives the thumb enough time to settle down so that a touch point 402 of the relevant data interpreted by the device is close to a settle point 403 of the thumb. On many of the keys in the experiment, the position of the thumb position did not noticeably move at all after the initial 0.06 sec, so the "short irregular thick line" referred to here shows up simply as a dot on those keys for example, without limitation, dots 404, 405, and 406 on the E, R, and T keys, respectively. These and other experiments by the applicant revealed that a data delay of at least 0.05 second (i.e. just under 0.06 second) significantly reduces the kind of thumb-typing errors discussed above in relation to FIG. 2 and FIG. 3, when combined with the activation-force, key size and spacing, and keyboard width characteristics discussed above. Further experiments with different text, users, and keyboard sizes helped confirmed this.

FIG. 5 illustrates an experiment where the data delay was increased to 0.08 second. Therefore, the software driver initially ignores the first 0.08 seconds after the thumb initially touches the screen with the required force then tracks the position of the thumb until the thumb lifts. With this data delay, there are few thick irregular lines on any of the keys typed, mostly dots, except for a short line 501 on the "I" key in this experiment. This illustrates the fact that this 0.08-second data delay allows the thumb to settle down even further than the 0.06-second data delay illustrated in FIG. 4 before the device starts interpreting the position of the thumb-press so the thumb gets even closer to its intended resting place. That results in fewer errors.

FIG. 6 and FIG. 7 illustrate parts of similar experiments with data delays of 0.10 second and 0.12 second, respectively. These resulted only in slight if any error-rate improvements over the 0.08-second delay illustrated in FIG. 5. Further experiments with data delays up to 0.20 second showed little or no error-rate improvements compared to the 0.12 second delay.

However, when the data delay reached 0.20 second, experiments show that typing becomes troublesome because the user is generally forced to slow down noticeably to give the device time to delay 0.20 second before reacting to each thumb type. In many cases, if the user tries to type at a comfortably fast speed, the user can easily press and release their finger from a key before the device had time to interpret the key press resulting in the device missing those key presses. Hence, with data delays of 0.20 second or more, experiments show that the user has to type at a slow rate to avoid those errors.

In summary, applicant's experiments show that data delays of 0.04 second or less result in errors due to the thumb not having time to settle before the key press is interpreted. Data delays of 0.20 second or more lead to errors resulting from the device failing to respond to some key presses, unless the user types very slowly. Accordingly, the preferred embodiment of the present invention is configured to ignore at least the first 0.05 second, and no more than the first 0.19 second. The experiments suggest that an ideal data delay range is between 0.08 second and 0.14 second, thereby providing sufficient time for the thumb to settle to a point where proper sizing and placement of active areas could eliminate the vast majority of thumb-typing errors for most people, without slowing the user's typing. Data delays of 0.10 or 0.12 second worked particularly well in the experiments with a device prototype using a virtual keyboard layout shown by way of example in FIG. 1 and having an activation force level in the range discussed above. Note that there are a number of ways to implement these delays. For example, without limitation, a device can use a clock-based timer; or a device can use an interrupt process. And in device implementations where data streams in at a fairly consistent rate from the touch-screen while the touch-screen is being activated (for example, without limitation, 400 bytes per second, or 20 packets per second, or some other measure of data per time), then the device can implement the delay simply by waiting for a certain amount of data to stream in from the touch-screen before using that data. In the context of this document, the word "timer" in a phrase such as "engagement timer" refers to whatever means the device uses to introduce that delay, whether it involves explicitly measuring time, or measuring an amount of data, or some other means. And in this context, "delay time" refers to the period where the data is ignored, whether that period was determined by explicitly measuring time passed or by measuring some other proxy for time passed, such as without limitation amount of data streamed. Different elements of different devices can contribute to a data delay—including without limitation I/O hardware and firmware subsystems, application software, and other elements. As long as the resulting data delay can be made fairly reproducible when monitoring data from the touch-screen, it is useful information, and a logical element of the device implementation can reliably determine when an appropriate data delay has followed a touch-screen activation (a.k.a. a touch-screen engagement). In this document, that logical element of the device implementation responsible for making that delay determination is referred to generically as an engagement delay filtering unit. For example, without limitation, the engagement delay filtering unit can be implemented as part of a touch-screen driver software. By experimenting with different data delay time values (as the applicant did here, with some experimental results illustrated in FIGS. 2-7), a device maker or virtual thumb-board implementer can find a delay time value for their specific device implementation that significantly reduces the gaps between touch points and settle points for thumb presses all over the display (resulting in more useful thumb position information), without the delays becoming so long as to hinder fast typing.

Note that this proper data delay is independent from the "debouncing" sometimes done with switches and touch-screens to disregard very brief bouncing of a finger on a component. Whether or not a user's thumb bounces on the touch-screen, the initial touch point location is often not a reliable indicator of where the user is attempting to press, as seen by way of example in FIG. 2. Waiting until a proper data delay period has passed allows the thumb to reach a "settle point" that is a significantly more reliable indicator of where the user is attempting to press. Implementing a proper data delay also improves the feel of typing on a virtual thumb-board, as opposed to providing visual or audible feedback the instant the finger touches down, largely because a proper delay between initial contact and feedback more closely matches user expectations for how quickly a keyboard is supposed to respond based on experience with mechanical keyboards.

Context-Sensitive Interpretation of Clicks:

Providing fast, comfortable typing on a virtual keyboard is one aspect of providing consumer-friendly devices that allow viewing content such as, but not limited to, Web pages, clicking on items, and typing text, all without a stylus or a mechanical keyboard. Another aspect is making sure that the device responds appropriately to "clicks" of the user's finger on the touch-screen, whether the user is typing, selecting a link on a Web page, or clicking the touch-screen for some other reason. To enhance the user experience, the preferred embodiment responds with different timing to a finger pressing on (or lifting off) the touch-screen when the user is typing keys on a virtual keyboard than when the user is clicking on a link or other selectable item on a Web page or other content.

Figure 8:
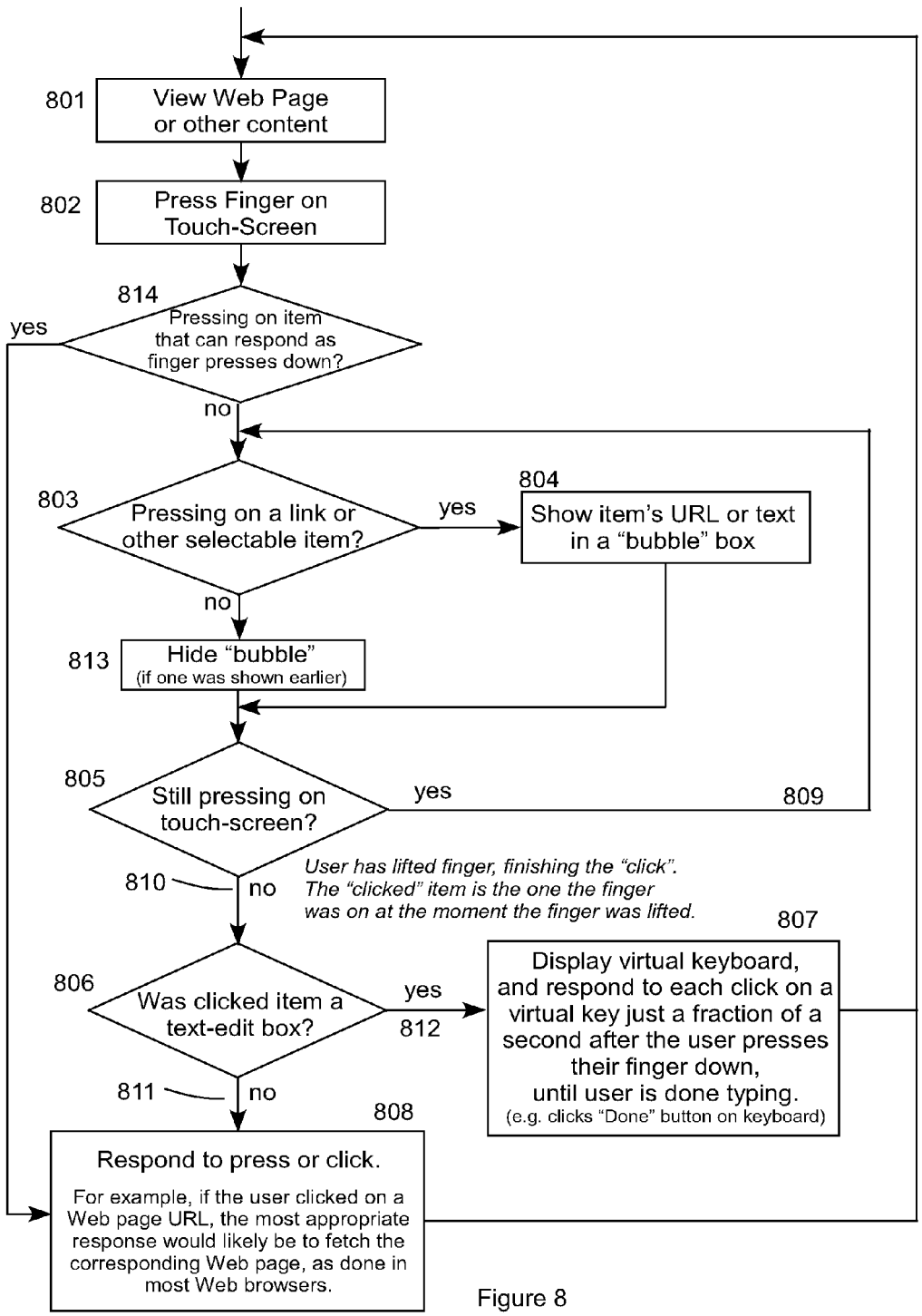
FIG. 8 is a flow chart that diagrams exemplary steps in a method that generally optimizes the user experience by using context-sensitive interpretation of clicks, in accordance with an embodiment of the present invention.

FIG. 8 is a flow chart that diagrams exemplary steps in a method that generally optimizes the user experience by using context-sensitive interpretation of clicks, in accordance with an embodiment of the present invention. In step 801 a user is viewing a Web page or some other application or content, and the user presses a finger down on the touch-screen in step 802. The finger could either be on an inactive spot, or on a selectable item that the UI allows to respond almost immediately while the finger is still down (such as, but not limited to, a virtual keyboard key or "dragable" content), or on another type of selectable item (such as, but not limited to, Web links) that the UI allows the device to respond to only after the user lifts the finger as long as the finger was still pressing that item the instant before the finger was lifted. In step 814, if the finger presses a selectable item that the UI responds to nearly immediately while the finger is still down (such as, but not limited to, a virtual keyboard key, but potentially other selectable items as well), the method proceeds to step 808 where the UI responds as appropriate almost immediately.

Otherwise, the device will enter a logical loop 809 and remain in logical loop 809 while the finger remains pressed down on the touch-screen. The method checks if the user's finger is still pressing the screen in step 805. Some embodiments may implement this logical loop as an interrupt driven process rather than a common software loop. An aspect of logical loop 809 is to prevent the device from moving on to processing the "click" until the user lifts their finger. While in logical loop 809, the user may be attempting to press a short link on a Web page where the link is closely surrounded by other short links. For example, without limitation, if the user enters five stock symbols into Yahoo!'s™ stock lookup page at http://finance.yahoo.com/, Yahoo! will return a table that includes a column of links for those five symbols. These short links are vertically close together. In such cases, the user's finger can easily cover the link that the user is attempting to click, along with a neighboring link. This is especially true if the user is using their thumb to click on the link on a mobile device, since thumbs can cover quite a bit of space, and mobile devices tend to display content at a smaller scale than desktop displays. In such cases, the user could have difficulty determining if their finger or thumb is over the link that they are attempting to click. During logical loop 809 when a user's finger is pressing the touch-screen and the finger is over a link or other selectable item in step 803, the link's URL or some other identifying information associated with the link or selectable item is displayed in a box or "bubble" that is not directly under the user's finger in step 804. In the preferred embodiment, this box or bubble is displayed above the finger, but in other embodiments the box or bubble may be shown in other positions such as, but not limited to, at the left or right of the finger. This assists the user in identifying which link his or her finger is pressing, even if that finger is covering the link. So if the user's finger is not pressing the link the user intended, without lifting their finger the user can move their finger a bit to find and press the intended link using the displayed related information shown in step 804 as it changes, to help ensure the finger has moved over the intended link. If the user's finger is not pressing on a link or other selectable item or moves off of the link or selectable item, the bubble, if one was shown above, will disappear. In the present embodiment, the device remains in logical loop 809 as long as the user's finger is pressing the touch-screen, even as the person moves the finger around.

At step 805, when the user lifts their finger from the touch-screen finishing the "click", the device proceeds along a path 810. In the present embodiment, the "clicked" item is the item on which the finger is pressing the moment immediately before the finger is lifted. If a "bubble" had been displayed in step 804 to show a URL name or other text while the user's finger was down on a corresponding selectable item, the bubble is now erased as shown in step 813. The user may move the finger around over other items before moving it to the item they eventually click by lifting their finger. For example, without limitation, in the Yahoo! example mentioned above, the user may press on one of the stock symbols in the column of stock-symbol links using a thumb. Then the user may move that thumb up and down the list without lifting the thumb, watching the related text that appears in step 804 displayed somewhere above their thumb on the display to help determine which link their thumb is pressing, even if their thumb covers the link. When their thumb is pressing the intended link, the user can lift the thumb to select that link. That link is the clicked item, in this embodiment.

By waiting until the user lifts the finger to determine which item is being clicked rather than selecting the item as the finger presses it, the user is given the opportunity to move his or her finger around on the touch-screen to ensure that they are clicking on the intended item before lifting their finger. The user can also move their finger to a blank, non-selectable part of the display before lifting that finger if they decide they do not want to click anything, even if they initially pressed a selectable item.

When the user lifts their finger to proceed along path 810, it is determined in step 806 if the item was a text-edit box. If the item is not a text-edit box, the device proceeds along a path 811 to step 808 where the device responds as appropriate for the given type of clicked item. For example, without limitation, if the clicked item is a link on a Web page (i.e. a URL), the most appropriate response would likely be to fetch the corresponding Web page, as done in most Web browsers.

If the clicked item is a text-edit box, such as, but not limited to, the search box on the www.Google.com home page or similar text-edit boxes on countless other Web pages, the device proceeds along a path 812. If the clicked item is a text-edit box, the user probably wants to edit text, so the device will display a virtual keyboard in step 807. As the user presses keys on the virtual keyboard, the device will type the corresponding characters within a fraction of a second after the user presses on each key, instead of waiting for the user to lift their finger to determine which key was clicked. Preferred embodiments will respond after a proper data delay, as discussed above, ignoring data from the touch-screen for a fraction of a second after the finger initially exceeds the activation force level for the touch-screen. Other embodiments may type the character immediately. In either case, the device types the character within a fraction of a second after the user presses on the corresponding key, rather than waiting for the user to lift their finger. By responding to key presses this way, finger typing (especially thumb-typing) is much more intuitive, fast, and comfortable than it would be if the device waited for the user to lift their finger off of each key before typing the corresponding character.

When the user is done using the virtual keyboard, the virtual keyboard can go away and the user can go back to step 801 to view the Web page or other content they were viewing before they clicked in the text edit box. In some embodiments, the virtual keyboard may include a button that the user can click to make the keyboard go away when they are done using it such as, but not limited to, done button 106 on the virtual keyboard shown by way of example on device 105 illustrated in FIG. 1. In other embodiments, the device can provide other mechanisms that let the user indicate when they are done using the virtual keyboard for the time being such as, but not limited to, an enter key, clicking the text box again, etc.

Notice that in this embodiment, when clicking on links or other selectable items on a Web page or other content, an item is not selected until the finger is lifted. By contrast, when operating a virtual keyboard, the device responds within a fraction of a second after the user presses their finger down, rather than waiting until the finger is lifted. By responding at different times to a finger pressing or lifting, depending on whether the user is typing on a virtual keyboard or clicking on a Web page link or other item, this embodiment helps optimize the user experience for whichever task the user is performing on the device at any given moment.

Proper Sizing and Placement of Active Areas of Virtual Keyboard Keys:

Referring to FIG. 1, in this embodiment, where the graphic target areas for the alphabet keys are about 7.5 mm wide and tall, active area 101 for the "P" key extends over 3 mm above and over 3 mm to the right of any part of rounded-rectangle target graphic 102. Similarly, the active area for the "Space" bar extends well below the bottom of the graphic target area for the Space bar. The graphic target shape for each key simply provides a visual target where the user should try to press their thumb to type that key. In the implementation illustrated in FIG. 1 and FIG. 9-B, the user's thumb will often fall a little outside of that target graphical square. As noted above, this is largely because as the thumb sweeps over different virtual keys or buttons at different locations on the touch-screen, the thumb tends to twist, or pronate, resulting in different spots on the thumb tip pressing down on the touch-screen. This depends on factors such as, but not limited to, where the user is pressing, the user's thumb size and shape, the way the user is holding the device, etc. Slight visual parallax also contributes to errors. By using active areas that are appropriately sized and placed relative to the graphic target areas, particularly when also using proper activation force levels and data delays as discussed above, the device can generally correctly interpret thumb presses anywhere on the activation area for a given key as being an attempt to type the corresponding key.

For example, without limitation, trials by the applicant have found that thumb-typing errors were reduced for adults with average-sized hands when the virtual thumb-board uses virtual alphabet keys whose active area extends at least 5 mm above the vertical center of the virtual alphabet key's graphic target, and at least 4.5 mm from the horizontal center of the key's graphical target toward the nearest vertical side of the display, and at least 3.5 mm from the horizontal center of the key's graphical target toward the further vertical side of the display. It also helps to make the active area for virtual keys that are displayed near the lower edge at the center of the device (e.g. the "V", "B", and "Space bar" in the example illustrated in FIG. 1) extend at least 4.5 mm below the vertical center of the corresponding key's graphic target area.

Extending the active areas a little more for some keys than for others may enhance thumb-typing accuracy even further, especially for adults with above average hand size. For example, without limitation, it was found to be helpful to do the following. Extending the top of the active area of each virtual alphabet key in the top line of virtual alphabet keys (e.g. the "Q", "W", "E" . . . "P" line on the U.S. English keyboard) to be 6.25 mm to 7.25 mm above the center of the graphic target for that key and extending the top of the active area of each of the other virtual alphabet keys to be 5.5 mm-6.5 mm above the center of the graphic target for that key may reduce typing errors. For each virtual alphabet key whose graphic target center is within 23 mm of either side of the display (e.g. "Q", "W", "A", "S", "Z", "O", "P", and "L" on the U.S. English keyboard illustrated by way of example in FIG. 9-B), extending the key's active area 5.5 mm-8 mm from that center toward the nearest vertical display side and 3.5 mm-5.5 mm toward the furthest vertical display side, and for each of the rest of the virtual alphabet keys, extending its active area out 4.25 mm-5.75 mm toward each vertical side of the display may reduce typing errors. Finally, ensuring that each virtual key active area completely encompasses the corresponding graphic target area will help reduce typing errors when thumb-typing, while also allowing use of a stylus on any part of the graphic target area. It should be noted that, of course, in many practical applications, users do not need to use a stylus to select thumb-optimized virtual selectable items given that the user can use a thumb. However, in some applications, it is contemplated that some users may want to use a stylus anyway—such as, without limitation, if they have dirt or food on their thumbs, or if they are wearing big gloves, etc. Otherwise, experimental data of the present invention demonstrate that it is faster and easier to use thumbs.

Other specific adjustments to the active areas resulted in even higher accuracy for wider ranges of people. As suggested above, for keys closest to the device sides (for example, "Q", "A", "Z", "P", "L", and "M" shown by way of example in FIG. 1, and especially the "Q" and "P"), it can help to extend the corresponding active areas a little further toward the display edges as illustrated by way of example in FIG. 2 by active area 205 for the "Q" key and active area 204 for the "P" key. It also helps to extend the active areas for the "V" and "B" keys a little lower than the neighboring "C" and "N" keys. These adjustments helped reduce errors, especially when users tried to type quickly, sweeping their thumbs from the center keys to the outer keys while typing sentences. Biasing other types of selectable items such as, but not limited to, normal buttons, check boxes, etc. also increases the performance of thumb typing. Note that FIG. 2 and the other Figures showing keyboards at a similar size as FIG. 2 are showing enlargements of keyboards that would actually be implemented about the same size as the keyboards illustrated in FIG. 1 and FIG. 9.

In the preferred embodiment, the activation area for each of the alphabetic keys ("A" through "Z") on the virtual keyboard are generally at least 9 mm tall and at least 9 mm wide. Using active areas smaller than this can make it difficult for a person with average or larger-than-average size adult hands to type the keys using thumbs without making significant numbers of errors as a result of typing outside the small active areas as the thumbs move among the virtual keys.

FIG. 9-A and FIG. 9-B illustrate an exemplary device with a virtual keyboard with active areas and graphic target areas that work well for a wide range of people, in accordance with an embodiment of the present invention. FIG. 9-A shows graphical target areas, active areas, and touch points from a user, and FIG. 9-B shows only the graphical target areas of the device. Note that in the embodiment illustrated in FIG. 9, each of the alphabetic keys concentrated near the center of the display (e.g. "T", "Y", "F", "G", "H", "V", and "B") has an active area with slightly lower top and slightly lower bottom (relative to the center of that key's graphic target area) than the keys nearer the display edges in the same row. Those central keys require the user to stretch out their thumbs further than keys that are closer to the lower-left or lower-right corners. That stretching tends to result in users making contact lower on those keys than on the virtual alphabet keys closer to the lower corners or sides of the device. The present embodiment also illustrates how a wide key like the Space bar can have an active area with different heights at different parts of the key. In FIG. 9-A, the space bar has taller active areas at the ends of the space bar than at the middle. Note that while the active areas have different sizes, shapes, and positioning, the graphic targets are aligned in straight rows, as users expect based on their familiarity with PC keyboards.

In the present embodiment, an active area 904 for the "P" key extends a little over 7 mm above the center of a graphical target 903 for the key, about 7 mm from the center of graphical target 903 toward the right side of the display, which is the side nearest to the center of graphical target 903, and about 4 mm toward the left side of the display, which is the further side of the display from the center of graphical target 903. So this key could be called "thumb-optimized". While an embodiment with active areas extending 5 mm above the center of the graphical target area is a good minimum guideline, extending the active area even further above the center of the graphical target of most of the alphabet keys produced even fewer errors. In the present embodiment, the active area extends 6 mm to 7 mm above the graphical target center of most of the alphabet keys, and a little over 7 mm above the graphical target center of the top line of alphabet keys. Similarly, some of the alphabet keys, especially the keys near the edges, have active areas that extend up to about 7 mm to the left or right of the center of the corresponding graphical target area. In prototype tests, users rarely made errors in which they typed significantly more than 7 mm left or right of a key's graphical target center, as illustrated by the user touch points shown in FIG. 9-A.

To allow users to still use a stylus or finger without confusion, an active area should generally at least cover the entire corresponding graphic target; and it should generally not overlap a neighboring graphical target. In the preferred embodiment, neighboring active areas do not "overlap", i.e. when the user touches a spot on the touch-screen, only one key is typed, if any. Alternate embodiments may be implemented that does not observe the suggestions in this paragraph. However, it would not be advised for most situations. It should be noted that some embodiments may have a single key type multiple characters or entire words or phrases, as short cuts to typing those words or phrases. Preferred embodiments configure each alphabetic key to type a single character.

Figure 10:
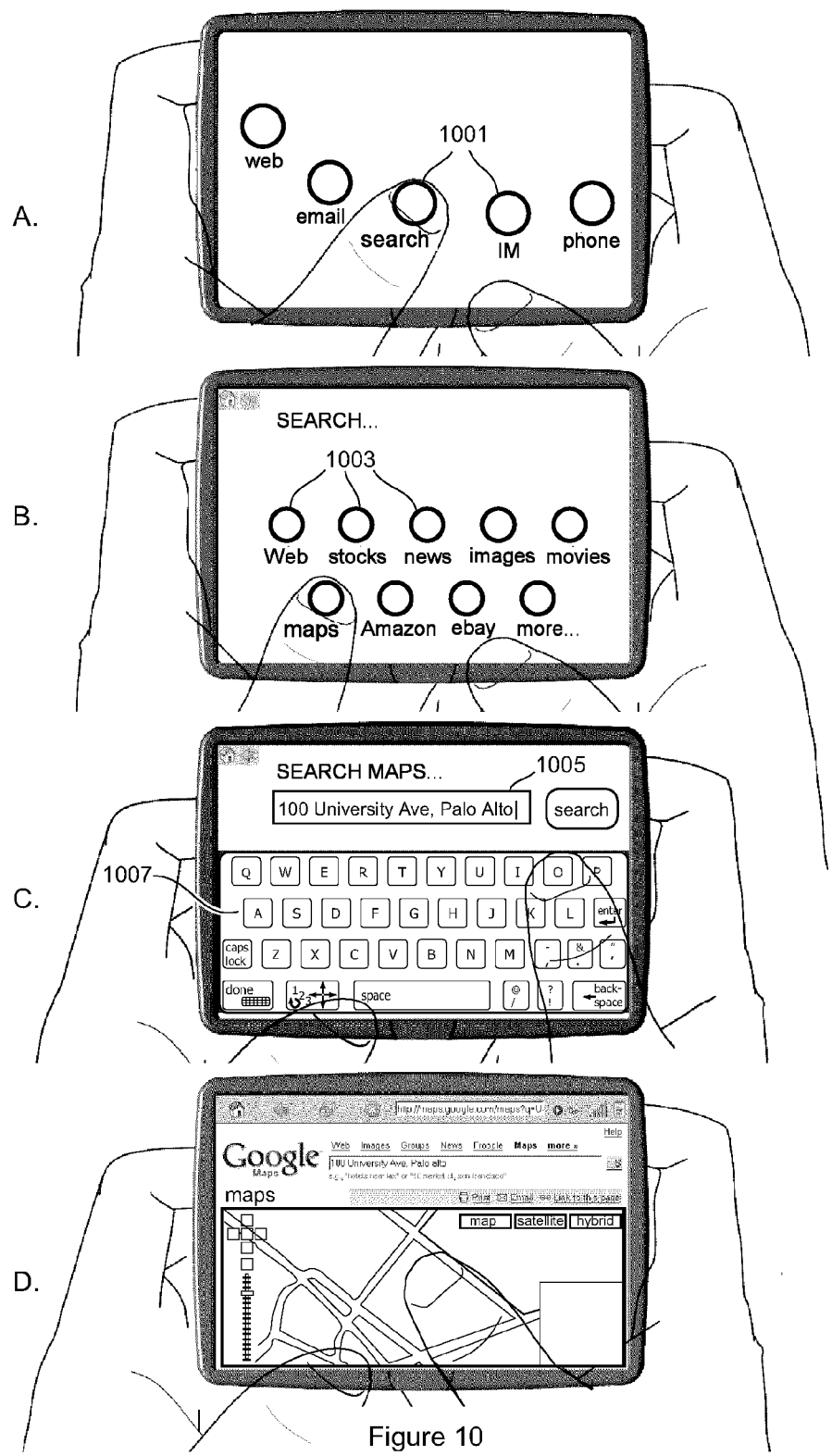
FIGS. 10-A through FIG. 10-D illustrate an exemplary search performed with a thumb-driven search interface, according to an embodiment of the present invention.

The illustrations in FIG. 1 and FIG. 9-A highlight the active areas by outlining each virtual keyboard key's active area with a gray rectangle, but in actual implementations the outline of the active areas can be (and generally should be in many practical embodiments) invisible to the user, as shown by way of example in FIG. 9-B and FIG. 10-C. When only the graphical target areas are shown, the user focuses on the graphic target area for each key, and is therefore inclined to try to click on that graphic target when they want to type that key. Some embodiments may have other graphic art outside of the graphic target area such as, but not limited to, a simulation of the downward-sloping sides of a computer keyboard key, but generally the graphic target area that the user should aim for should be clearly distinguished from the peripheral art.

In some embodiments the active areas may extend a little further up, down, or to the sides of certain keys, relative to the active area of others keys. This can help compensate for the tendency of a user's thumb to hit above, below, or to the side of keys at certain positions on the keyboard. For example, without limitation, referring to FIG. 1, in the virtual keyboard illustrated by way of example, as a user's right thumb sweeps up to graphical target area 102 for the letter "P", the thumb tends to twist outward, or pronate, and hit slightly above and to the right of the center of graphical target area 102. If active area 101 is too tight around graphical target area 102, when the user presses outside of graphical target area 102, the "P" key will not be typed. By making active area 101 for the letter "P" extend a little right and above graphical target area 102, fewer typing errors will occur. Similarly, when users try to click directly on the target graphic for keys near the lower center of the screen, such as graphical target area 103 for the letter "B", the position of their thumb may tend to result in pressing on the screen lower than intended. So extending active area for those lower center keys can help reduce typing errors. Note that the active area of a given key does not have to have the same top or bottom as its neighboring keys. For example, without limitation, the active area corresponding to the "I" key could extend higher than the active area for the "U" key, if desired. This is related to the reason that the miniature mechanical keyboards on some hand-held devices, such as, but not limited to, the RIM Blackberry and the Palm Treo, are arranged into "smile" formations or "cleavage" formations. As the thumb sweeps to different positions, it is easier for a user to hit the keys accurately if they are positioned slightly higher near the upper sides and slightly lower near the lower center. By varying the size and placement of active areas depending on the location of the key, allows for comfortable, accurate typing while providing a clean looking, straight-lined keyboard.

With a virtual keyboard, the designer has the option of arranging the target graphical squares for the keys in straight horizontal lines, as shown by way of example in FIG. 1, while adjusting the borders of the larger active areas for each key independently of other keys' active areas. The borders of the active areas for each key, such as, but not limited to, active area 101 shown by way of example in FIG. 1, will generally be invisible, since the user only needs to see the target graphic square for each key, for example graphical target area 102 shown by way of example in FIG. 1. However, some embodiments may have the option of making the active areas or their borders visible as well. In the preferred embodiment, the virtual keyboard has the target graphical squares evenly spaced and aligned neatly in straight lines, as shown by way of example in FIG. 1, while the properly placed and sized active areas account for differences in how thumbs touch down differently at different places on the display. The preferred embodiment of the present invention allows accurate and comfortable thumb-typing, even for first time users, by people with a wide range of hand sizes, including, but not limited to, above average hand sizes, on a pocket-size device displaying a standard looking QWERTY alphabet layout with straight even rows of virtual keys.

The virtual thumb-board shown by way of example in FIG. 9-A is implemented for a display 105 mm wide. Experimental data for certain embodiments of the present invention show that this width allows adults with average size thumbs to easily and comfortably reach their thumb-pads to the center of a virtual thumb-board that spanned most of the device face, while holding the device naturally, assuming the device has a frame around the display that is not very much wider than the display at the position the user comfortably holds the device while thumb-typing. In many practical applications, the present device is preferably not more than 2× the length of an average thumb of the intended users as measured from the thumb's second knuckle to the thumb tip, when implementing a non-split virtual thumb-board, which is easier to use than a split thumb-board in many practical applications. Otherwise, some users may not easily be able to reach the center of the non-split virtual keyboard with their thumb pads. Of course, users can stretch, but that tends to make usage slower, more awkward, and more error prone. Experiments carried out by Applicant show that even after implementing a proper data delay, when users attempt to press their thumbs on some graphic targets such as, but not limited to, a graphical target area 901 for the "L" key, the users' thumb frequently settles outside the graphical target area 901. A dot within an active area 902 for the "L" key above graphical target area 901 represents where the user's thumb settled in one instance in one experiment. Other dots shown in FIG. 9-A represent where the user's thumb settled when attempting to press other keys in this one experiment. The embodiment illustrated in FIG. 9-A is designed to allow a user to be able to type virtual keys corresponding to letters of the alphabet with great speed, comfort, and ease. The present embodiment is slightly less concerned with punctuation keys. By testing with people of various hands sizes and thumb-typing styles, it has been found that laying out the active areas for the virtual alphabet keys relative to the corresponding graphical target areas according to the present embodiment makes the virtual thumb-board more robust and accurate than layouts that simply extend the active area a fixed distance around every side of each alphabet key's graphical target area.

In the present embodiment, the graphical target area for each virtual alphabet key is about 7.5 mm in diameter. Alternate embodiments may have graphical target areas that are bigger or smaller, as long as it provides a fairly well defined target at which the user can aim their thumb to attempt to type the corresponding character. In the present embodiment, the active area for each virtual alphabet key extends at least 6 mm above the center of the graphical target area for that key; and the active area for each virtual alphabet key extends left or right at least 4.5 mm from the center of the graphical target toward the closest vertical display edge with the active areas for alphabetic keys closer to the sides of the device extending a little further toward the nearest side than active areas for alphabetic keys closer to the horizontal center of the device. For example, without limitation, active area 902 for the "L" key in the present embodiment extends about 6 mm above the center of graphical target area 901 for the "L" key, and extends about 5.5 mm right of the center of graphical target area 901. An aspect of properly sizing and placing active areas relative to graphic target areas is that it enables keeping the graphic target areas neatly aligned into straight rows as illustrated in FIG. 9b, which corresponds to the mental map users have for keyboards based on their experience with mechanical PC keyboards. Conventional virtual thumb-boards often resort to big curved keyboard layouts, which results in many users having to "hunt and peck" for keys that are not placed where the user expects them to be, relative to the other keys, even when the user is already a good typist on standard PC keyboards. With the present embodiments, experiments have shown that people who know how to type on regular PC keyboards can instantly and easily thumb-type on the present virtual thumb-board embodiments with a good accuracy and comfort level, simply using their thumb pads.

Generalizing to Wider Range of Virtual Selectable Items:

The above description about properly placing and sizing active areas for virtual keys can be generalized to any type of virtual selectable item. A virtual alphabet key is a selectable item that happens to look like a keyboard key. Selectable items can alternatively look like buttons, menu items, wheels, check boxes, or many other types of virtual "controls". Almost any virtual selectable item displayed on a hand-held device touch-screen can be "thumb-optimized" (i.e. the device can be made to make selecting and using the item easier and more accurate) by sizing and placing the item's active area relative to the item's graphic target area in ways analogous to those described above for virtual keyboard keys, especially when combined with the proper data delay and other optimizing elements outlined above. A virtual wheel control is an interesting special case, which is discussed below. In the following description, the term "control" and "selectable item" will generally be used interchangeably. Some embodiments may include non-thumb-optimized items such as, but not limited to, seldom used punctuation keys, relatively rarely clicked selectable icons in places where space is tight such as the little battery charge icon tucked in at the right of the URL bar at the top of the screen in FIG. 10-D, calibration dots meant to be used only with a fine-pointed stylus, or in some cases finger-selectable items that are right up against the display frame edge where users are physically prevented from clicking beyond that edge of the item.

In many practical applications for a thumb-optimized virtual selectable item it can be assumed that the active area will generally extend beyond the item's graphic target border, especially if the graphic target area is smaller than 9 mm tall or wide. Furthermore, a slightly more specific assumption is that the active area will generally contain the graphic target area and include points that are at least 4.5 mm from the graphic target center. Another simple assumption, for some applications, to help thumb-optimize the active area of any basic selectable item (e.g. a button) that may be applied to some embodiments is to simply extend the active area all around the item's graphic target border by at least 1.5 mm at every point along the item's graphic target border.

Active Area Biasing By Region on Display:

If there is room on the display, the active area can be extended quite far, but if there are other nearby selectable items, as is common with keyboards, one has to be more careful about how far to extend each item's active area, as with the virtual thumb-board case. A selectable item's active area generally should not "overlap" the active areas of other selectable item so that clicking on an active area point should select only one item, in most practical circumstances. So it can be useful to only extend the active area as much as needed to avoid most errors, but not much more. The can be accomplished by extending the active area relative to a corresponding graphic target more in some directions than others, depending on where the graphic target is drawn on the face of the device.

In general, when a user grips a device as illustrated by way of example in FIG. 9-A, tries to press a thumb on a touch-screen at a specific displayed target point, and misses the target point, the user tends to miss as follows more often than in other ways. If the user is aiming for a target point that is near the horizontal center of the bottom edge of the device where their thumb tends to roll toward the bottom of the device, they tend to miss below the target point. If the user is aiming their left thumb for a target point that is near the vertical center of the left side of the device where their thumb tends to extend and roll outward toward the side of the device, the user tends to miss above and/or toward the left of the target point. Similarly, if the user is aiming their right thumb for a target point that is near the vertical center of the right side of the device, the user tends to miss above and/or toward the right of the target point. If the user is aiming for a target point that is near the top of the device where they have to stretch, the user tends to miss below the target point. If the target point is also near one side near the top of the display, the user also tends to miss toward that side of the device, which at least in part, assumes that people naturally tend to use the left thumb when it is closest to the intended target and the right thumb otherwise. These are not absolute rules, but merely tendencies that arise from the way most people use their thumbs. By "biasing" the way the active areas extend relative to the graphical target for virtual selectable items, the present embodiment is able to reduce overall error rates significantly.

There are many possible embodiments of this element of the present invention. One specific embodiment for "thumb-optimizing" a virtual selectable item on a touch-screen-based pocket-size hand-held device is as follows. The following is one detailed embodiment description for extending the active areas to account for the thumb-related error tendencies or "biases" described above, where different types of errors tend to occur at different regions of the display. First, ensure that the item's active area fully contains every point in the item's graphic target area. Then, for every point in the item's graphic target area that is within 25 mm of the bottom of the device frame or within 20 mm of the bottom of the display, and at least 45 mm away from the lower-left or lower-right corner of the device frame or at least 40 mm from the lower-left or lower-right corner of the display area, such as, but not limited to, the center of the space bar in FIG. 1, ensure that the item's active area extends at least 5.2 mm below and at least 3.8 mm above the vertical center of the graphic target area as measured at that graphic target point's horizontal location, except if the active area would have to extend outside the display's viewable pixels. Then, for every point in the item's graphic target area that is within 25 mm of the left of the device frame or within 20 mm of the left side of the display area, and at least 25 mm from the bottom of the device frame or at least 20 mm from the bottom of the display area, such as, but not limited to, the "A" and "Q" keys in FIG. 1, make sure the item's active area extends at least 5.2 mm above and at least 3.8 mm below the vertical center of the graphic target area as measured at that graphic target point's horizontal location; and make sure the item's active area extends at least 5.2 mm to the left and at least 3.8 mm to the right of the horizontal center of the graphic target area as measured at that graphic target point's vertical location, except if the active area would have to extend outside the display's viewable pixels.

Similarly, for every point in the item's graphic target area that is within 25 mm of the right of the device frame or within 20 mm of the right side of the display area, and at least 25 mm from the bottom of the device frame or at least 20 mm from the bottom of the display area, such as, but not limited to, the "L" and "P" keys on FIG. 1, make sure the item's active area extends at least 5.2 mm above and at least 3.8 mm below the vertical center of the graphic target area as measured at that graphic target point's horizontal location. Also, make sure the item's active area extends at least 5.2 mm to the right and at least 3.8 mm to the left of the horizontal center of the graphic target area as measured at that graphic target point's vertical location, except if the active area would have to extend outside the display's viewable pixels. Then, for every point in the item's graphic target area that is within 25 mm of the top of the device frame or within 20 mm of the top of the display, make sure the item's active area extends at least 5.2 mm below and at least 3.8 mm above the vertical center of the graphic target area as measured at that graphic target point's horizontal location, except if the active area would have to extend outside the display's viewable pixels. Additionally, if that graphic target point is also within 25 mm of one vertical side of the device frame or within 20 mm of one vertical side of the display area, make sure the item's active area extends at least 5.2 mm toward that side and at least 3.8 mm toward the other side from the horizontal center of the graphic target area as measured at that graphic target point's vertical location, except if the active area would have to extend outside the display's viewable pixels. And for every point in the item's graphic target area that is not in one of the display regions described above, the active area should extend at least 4.5 mm above and below the vertical center of the graphic target area as measured at that point's horizontal location, and should extend at least 4.5 mm left and right of the horizontal center of the graphic target area as measured at that point's vertical location.

Note that for the embodiment previously described, regardless of where a thumb-optimized selectable item is drawn on the display, it will have an active area that is at least 9 mm wide and 9 mm tall. Also, when such embodiments are described using a phrase such as, but not limited to, "left side of the display area" or "left side of the display", it means the left side of the area containing viewable pixels, not parts of the electronic display module that do not include pixels. Similarly, a phrase such as, but not limited to, "outside of the display" means outside of the area containing viewable pixels.

A user-interface implementation can include some items that are "thumb-optimized" as taught by some embodiments of the present invention, and other items that are not. Generally, any selectable virtual item that will be accessed frequently by the user should be "thumb-optimized". These thumb-optimized active area specifications work best when combined with the proper data delay discussed above, to avoid the problem of the thumb's touch point often being different from its settle point, as discussed above.

Figure 11:
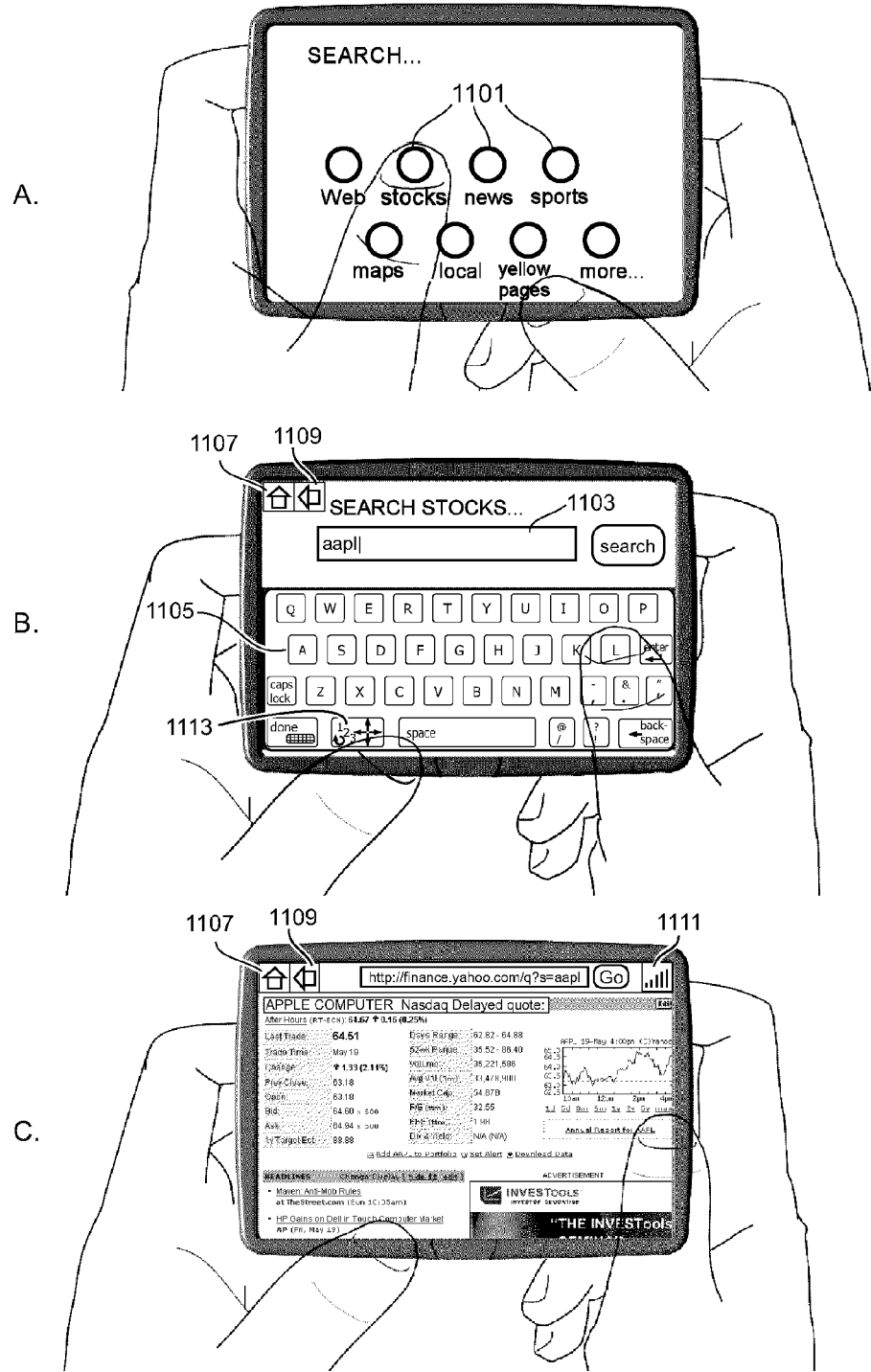
FIG. 11-A, FIG. 11-B, and FIG. 11-C illustrate an exemplary search sequence performed with a thumb-driven search interface, in accordance with an embodiment of the present invention.

FIG. 10 and FIG. 11 illustrate examples of embodiments of the invention involving Internet searching. These will be discussed further below.

Some embodiments of the present invention, as illustrated by way of example in FIG. 10 and FIG. 11, allow for Internet searching that is far more comfortable, quick, and intuitive than other general-purpose search approaches on other handheld devices. Functional prototypes of the present invention have been constructed, which demonstrate that quickly performing a series of several types of searches, for example, without limitation, looking up today's news articles that mention "Steve Jobs", then getting a stock quote for Apple Computer's stock symbol "AAPL", then finding images of "iPods", and then looking up a map for a given address, takes just a few seconds with these embodiments. Performing the same series of searches takes much longer in many applications and often requires significantly more effort on every other hand-held device tried, including without limitation a range of hand-held Palm Treo, Research in Motion Blackberry, Windows Mobile, Tablet PC, and "UltraMobile PC" devices. On devices that require a stylus for text input, typing is significantly slower than the thumb-optimized virtual keyboard of these embodiments. On devices that use mechanical controls to select items, the user often must change grips when switching from typing to item selection, and the user must generally use a control (such as, without limitation, a control wheel or 2-way or 4-way pointer control) to first navigate to an item before then pressing a button to select that item—which more than doubles the amount of movement and concentration required to select any given item, compared to simply pressing the item with a thumb. This extra time and effort might not seem like a significant factor when only selecting one or two items. But many tasks—including conducting a series of search tasks—involve a sequence of selecting many items and typing a significant amount of text, and the extra time and effort involved at every step in the process quickly adds up to making the overall experience slow and tedious. The present embodiments make any tasks that involve a significant amount of UI navigation and typing faster and easier. Since information-lookup is one of the primary tasks people want to do with mobile devices, along with communication tasks, these embodiments' optimization of information-lookup tasks is particularly desirable.

Thumb-Driven Virtual User Interface Systems for Information Searching and UI Control:

A consequence of the virtual thumb-typing solution part of the present invention is that it opens the door to a new class of palm-size devices whose most frequently accessed user interface (UI) elements can be fully and effortlessly operated from one extremely fast and comfortable grip, using thumbs on a dynamic touch-screen-based UI.

Mechanical thumb-boards introduced by Research in Motion (RIM) in the 1990s showed how comfortably people can click keys with their thumbs on the face of small devices that they grip with their fingers behind the device. RIM's successful mobile email business is based largely on that man-machine-interface advance. However, until now, a thumb-based "grip architecture" could not practically be extended to fast, comfortable, fully dynamic virtual user interfaces, largely because until now, fast and comfortable thumb-typing on mobile devices required a mechanical keyboard. Typing with a stylus proved to be much less comfortable and quick. Requiring an attached mechanical keyboard (or a stylus) would interfere with users trying to continuously hold the device comfortably while using their thumbs to click on displayed virtual items as easily as they can thumb-type. That would require the user to change the device configuration (e.g. slide or fold the mechanical keyboard away), or awkwardly change their grip to reach over or around the mechanical keyboard, every time they transitioned between typing text with their thumbs and operating the rest of the thumb-optimized virtual UI, and users constantly transition between entering text and manipulating the UI when doing Internet searches, Web browsing, and many other tasks users like to do with mobile devices. By solving the virtual thumb-board problem to a sufficiently high level of accuracy and comfort, embodiments of the present invention allow thumb-typing and thumb-driven UI navigation to take place on the same display without changing grip, which allows implementation of new, extremely quick and effortless, thumb-optimized, fully dynamic virtual user interfaces. An embodiment providing comfortable, fast, and intuitive Internet searching is described next. In foregoing embodiment descriptions, each "virtual user interface system" has a touch-screen—which is used to select items on the virtual user interface.

A general embodiment of the class of thumb-driven user-interface systems enable a user to click a virtual selectable item on a screen, where a "screen" in this context is simply a given displayed layout of content, to make the device display a different screen. When the user needs to type, the user can use a thumb-optimized virtual keyboard (as discussed above). Preferably all virtual selectable items in such a UI system would be thumb-optimized using the techniques discussed above.

FIGS. 10-A through 10-D illustrate an exemplary search performed with a thumb-driven search interface, according to an embodiment of the present invention. In FIG. 10-A, the user is using a thumb to click on one of a plurality of graphic symbols, or icons 1001. FIG. 10-B shows a screen with another set of icons 1003. FIG. 10-C shows a screen with a text box 1005 and a virtual keyboard 1007, and FIG. 10-D shows the screen from the result of the user's search. The icon chosen by the user in FIG. 10-A is labeled "Search". In the present embodiment, that click would result in the device immediately showing a new screen showing another set of icons 1003, as illustrated in FIG. 10-B. Each icon 1003 shown in FIG. 10-B corresponds to a type of search or information-lookup the user might want to do such as, but not limited to, Web, stocks, news, images, maps, etc. With another thumb click on the "maps" icon, the device immediately changes the display to show virtual keyboard 1007 and text-edit box 1005 into which the user can thumb-type an address, as illustrated in FIG. 10-C. The user can then type in an address using thumb-optimized virtual thumb-board 1007. When complete, the user can click the Enter button on the keyboard to submit the search in this example. The device would then send the query to a remote search server (e.g. Google Maps, in this example), and display the results much like a desktop Web browser, as illustrated in FIG. 10-D. In this example, the device used Google Maps, and Google Maps allows clicking and dragging the map around the display. With the present embodiment, the user can simply press their thumb down and drag the map around instantly, effortlessly, and without changing the way they are holding the device.

FIG. 11-A, FIG. 11-B, and FIG. 11-C illustrate an exemplary stock search sequence performed with a thumb-driven search interface, in accordance with an embodiment of the present invention. FIG. 11-A shows a screen with multiple icons 1101 indicating search options. FIG. 11-B shows a screen with a text-edit box 1103 and a virtual keyboard 1105, and FIG. 11-C shows a results screen. The present embodiment starts with a page with multiple icons 1101, each corresponding to a different type of search the user could do, illustrated in FIG. 11-A. This is the same as FIG. 10-B, and the user could have got to this screen the same way, or through some other UI mechanism. In the present example, the user clicks on the "stocks" icon to start a stock search, which takes the user to a screen with virtual keyboard 1105 and text-edit box 1103, shown by way of example in FIG. 11-B. The user then types in a stock symbol, and clicks the Enter button to begin the search and see the results. If the results page, shown by way of example in FIG. 11-C, is scrollable, and the device implements touch-sensitive "slider" edges or dedicates strips along the edges of the touch-screen for scrolling, the user's hands are in perfect position to use a thumb to scroll, as suggested by the right thumb in FIG. 11-C. The user can use either thumb to click on links or other selectable items seen on the search result Web pages. Referring to the description of FIG. 8, one way is disclosed to assist users in selecting links with thumbs, which might cover up a link while trying to click on it.

Since the embodiments illustrated in FIG. 10 and FIG. 11 use a thumb-optimized virtual keyboard that goes away when not needed for example, without limitation, when the user clicks the "Enter" key to do a search, or clicks the virtual keyboard's "done" key, almost the entire surface of the device can be devoted to display area, which allows exceptional views of Web pages and other content for a device this small. The embodiment illustrated in FIG. 10 and FIG. 11 is approximately the size of a Palm Vx, or about 4.6" by 3.1".

Referring to FIG. 10-C and FIG. 11-B, the user can type search query text into the text-edit box on these screens. In this context the box can be called a "search query box", "search box", or "query box".

The present embodiments, have a Home button 1107 and a Back 1109 button located in the top left corners of UI pages, and in a URL bar on Web pages, as illustrated by way of example in FIG. 10 and FIG. 11, allowing users to easily return to a home page or to back up one page in a sequence of page transitions by clicking a thumb on the Home or Back icon. FIG. 11-A illustrates an exemplary home page. In the specific embodiments illustrated in FIG. 10 and FIG. 11, the Home and Back buttons may not have the ideal active area sizes described in other described embodiments for "thumb-optimized" selectable items. However, items like these Home and Back buttons that are up against the inside edge of the display frame are easy to accurately activate, at least in part because the frame prevents a thumb pad from settling outside of the touch-screen.

Another aspect of the embodiments illustrated in FIG. 10 and FIG. 11 that increases their speed is as follows. Up until the moment the user hits the Enter key after typing in a search in a search query box in these embodiments, the device has not had any need to contact any remote query or search server at least in part because all of the UI screens in these embodiments other than the result pages, shown by way of example in FIG. 10-D and FIG. 11-C, can be stored and rendered locally on the device. By contrast, a typical Internet search done by a typical user on a typical Web browser involves at least two remote server contacts, one to fetch the Query page, and a second one to fetch the results page. In fact, each of these fetches could involve multiple server "hits", to fetch multiple images or other items. Most desktop Internet connections are so fast these days that that the multiple server "hits" do not significantly affect the user experience. However, many wireless protocols still have noticeable latency delays. By avoiding a Query page fetch, and by only introducing a single potential delay after the user is done setting up the search, for example, without limitation, by pressing an Enter key, these search interface embodiments can be performed very quickly in many practical applications.

In the embodiments illustrated by way of example in FIG. 10 and FIG. 11, most of the selectable, or "clickable", items throughout the UI implement the thumb-optimizations discussed above, with proper sizing and placement of active areas for each important icon or alphabetic keyboard key. These embodiments also implement the proper data delay and other key elements of the present invention. Note that the active area boundaries are invisible in these embodiments; only the graphic targets are shown. Generally, the active areas encompass the icon and label on screens such as the screen shown by way of example in FIG. 10-A. In some embodiments it is also acceptable to not "thumb-optimize" some clickable icons, such as, but not limited to, icons that are rarely clicked, or icons at the very edge of the display where the display frame prevents thumb pads from settling above the active part of the touch-screen. A battery icon 1111 at the top right of the display illustrated by way of example in FIG. 11-C is an example of an icon whose active area does not necessarily have to meet the "thumb-optimization" guidelines previously discussed.

Usually these embodiments allow the user to easily use whichever thumb is closest to the item they want to press, just as users can easily use either thumb, as appropriate, to type on keys on a mechanical thumb-board, typical reaching with whichever thumb is closest. Experiments by applicant discovered that users quickly become proficient and fast at clicking through these display sequences, often starting to move one thumb before the other thumb has even lifted from its previous click. This is noticeable when watching users thumb-type, after they have become proficient thumb-typists. The present embodiment allows users to just as easily step through dynamic, virtual user interfaces using both thumbs.

In the embodiments shown in FIGS. 10 and 11, number characters would be accessed by clicking on a "1-2-3" key 1113 at the lower left of the virtual keyboard, to bring up a virtual number pad. This would change the displayed keyboard to a virtual number pad, which would be dismissed by clicking on a "done" button on the number pad screen. This is an example of one benefit to implementing a virtual thumb-board as opposed to a mechanical thumb-board. The actual keyboard layout can change dynamically as the user types. In this example, the keyboard changes to a number pad on demand, but a more sophisticated embodiment would be typing, for example without limitation, Chinese text, where there are thousands of characters, too many to fit on any one display. In this embodiment the user could type using any number of Chinese input methods where typing one character on the keyboard leads to the device suggesting likely next keys to type or presenting lists or arrays of next choices. With a thumb-optimized UI including a thumb-optimized virtual thumb-board, those "next options" can be presented directly on the touch-screen, with the keyboard layout changing dynamically as the user types, and the user can instantly use a thumb to click on the best next option they see at any given moment, without changing their grip. By contrast, with a mechanical thumb-board, or a mechanical computer keyboard, the user only sees one fixed set of labels on the mechanical thumb-board or keyboard, and has to mentally map what they see on that mechanical board to whatever options may be presented above on a display, and often must change their "grip" (i.e. how their hands were positioned while typing) to use a pointing control to select from the options as they appear. That "mental mapping, and any frequent grip changing are much less intuitive and efficient than simply seeing an option and clicking it with a thumb that is already in position to reach it. It is contemplated that some embodiments could show other icons in addition to or instead of those shown on any of these pages, for example, without limitation, icons corresponding to other search areas, or corresponding to other types actions, such as, but not limited to, buttons to move to other parts of the user interface.

Thumb-Optimized Virtual Wheel Control:

FIG. 12-A illustrates an exemplary user interface using a thumb-optimized virtual wheel control 1200, in accordance with an embodiment of the present invention. In the present embodiment, the user uses virtual wheel control 1200 to "roll" through a list of items 1205, changing a highlighted item 1206 as the thumb slides along virtual wheel control 1200. Typically, the user then taps a button to select the highlighted item and the device would respond appropriately depending on which application is running and the current context. The selection button can be defined as a part of the scroll wheel that behaves differently to a tap than to a sliding motion. This form of item highlighting with a wheel control is done on iPods and other devices some of which use touch sensors shaped like a wheel. However, a virtual wheel drawn on a portion of a touch-screen, as in the present embodiment, behaves differently than a wheel-shaped control that uses a dedicated or tightly framed touch-sensor. With a virtual wheel drawn on a portion of a touch-screen, the user's thumb contact point will often fall a outside of a virtual wheel graphic target area 1201 as the user "rolls" their thumb around virtual wheel control 1200 since there is no frame to constrain the thumb on the graphic target. This results in errors and erratic responsiveness that can be largely reduced or eliminated by implementing embodiments of the present thumb-optimizations for touch-screen-based virtual wheel control 1200, as will be next described in some detail. Without the thumb-optimizations, keeping a thumb strictly within wheel graphic target area 1201 is a bit like trying to "color within the lines" with your thumb. It can be even harder to do accurately on a touch-screen than clicking on a small keyboard key graphic target, which, as described above, results in many "outside-the-line" errors unless the thumb-optimizations for keyboard keys aspect of the present invention is implemented.

To "thumb-optimize" virtual wheel control 1200 requires properly sizing and placing an active area 1202 relative to wheel graphic target 1201, analogous to the optimizations outlined above for virtual keys and buttons. However, a wheel is different from a simple solid button. A wheel has a hole 1204, which can optionally operate as an independent button, and the user slides their finger along the strip wrapped around hole 1204. A user operates virtual control wheel 1200 by sliding their thumb along the wheel graphic target 1201 that surrounds hole 1204. Users will generally try to "center" their touch along a center line 1203 of that strip, forming a circle within the circular wheel strip. Some embodiments may visually mark wheel-strip center line 1203. It is generally not necessary to do so, since users tend to naturally attempt to slide their thumb along the center of virtual control wheel 1200. However, as demonstrated by way of example above for virtual keyboard keys, when a user places or moves their thumb on virtual control wheel 1200, the actual contact point between the thumb and the touch-screen can be well outside of the graphical target area. As with virtual keyboard keys discussed above, virtual wheels can be "thumb-optimized" by implementing an active area 1202 that extends beyond wheel graphic target 1201. As with virtual keyboard keys, people using this form-factor with their thumbs will often make contact with the touch-screen higher than the spot on the virtual wheel at which they are aiming their thumb, and for contacts point near a side of the display, the user will tend to make contact a little closer to that side of the display than the spot at which they are aiming. Extending active area 1202 higher than the boundary of wheel graphic target 1201, and further toward the nearest display side, will make selection more comfortable, accurate, and reliable. Some embodiments may also extend active area 1202 below the graphic target, or beyond the graphic target boundary on the side away from the nearest display edge (e.g. the left side of the scroll wheel in the example in FIG. 12-A) although for a wheel positioned toward a lower corner of the device where the user can most comfortably operate it with a thumb, users are more likely to "overshoot" the graphic target above and toward the nearest display edge. The present embodiment accounts for this "bias" toward the upper and (in this example) right side of the graphic target of virtual control wheel 1200, while still accommodating possible small overshoots below or (in this example) to the left, by using a slightly asymmetric active area 1202.

As with the guidelines for keyboard keys, active area 1202 preferably at least fully encompasses the graphic target 1201. Preferred embodiments further extend the active area 1202 out around all or at least part of the wheel graphic target 1201.

In one embodiment, the outer border of the virtual wheel active area would extend at least 5 mm beyond the outer border of the virtual wheel graphic target along the top and along the side closest to the nearest vertical display edge, and extend at least 3 mm beyond the rest of the outer border of the virtual wheel graphic target. This can result in slight asymmetry in the active area, similar to the asymmetry in the outer border of virtual wheel active area 1202 in FIG. 12-A. In another embodiment, which could be more appropriate if other buttons or controls are included fairly close to the scroll wheel, the outer border of the virtual wheel active area would extend between 2 mm and 6 mm beyond the outer border of the virtual wheel graphic target along the top and along the side closest to the nearest vertical display edge. Otherwise the outer border of the virtual wheel active area could match (or exceed by just a little for example, without limitation, 2 mm) the rest of the outer border of the virtual wheel graphic target.

In the present embodiment, the center of virtual control wheel 1200 is used as an independent button. Therefore, active area 1202 has a hole in it corresponding to hole 1204 in wheel graphic target 1201 corresponding to the button, and an independent active area for the button is implemented. While the active area for that central button could be allowed to expand a little into the inside part of wheel graphic target 1201, in many practical applications, it is wiser to restrict the active area of the button to coincide with, or even be slightly inset within, hole 1204 in wheel graphic target 1201. This suggests that the graphic target of hole 1204 generally should be large enough so that its active area can meet the thumb-optimizing criteria outlined for keys and buttons while fitting within the graphic target boundaries. In the present embodiment, the button is 0.5-inch diameter (12.7 mm), which is large enough to hold an active area that meets those guidelines outlined for thumb-optimized keys.

In addition to these active area sizing and placement considerations, implementing a proper data delay (described above) for virtual wheel embodiments will improve the device's interpretation of the initial selection point and initial movement relative to that point. Recall that, as illustrated by way of example in FIG. 2, the thumb sometimes touches down at one location, touch point 201, but quickly moves to a settle point 202 that can be significantly closer to the spot the user is attempting to click. If a user presses a thumb down on a scroll wheel, as illustrated by way of example in FIG. 12-A and FIG. 12-B, that initial settling behavior can be misinterpreted by the device as intentional sliding of the thumb around the wheel. This misrepresentation can be avoided or minimized by implementing a proper data delay, as discussed above, so the device will only start to pay attention to the thumb's movement along the wheel after the initial settling by the thumb. In a specific embodiment this data delay may be between 0.05 second and 0.19 second, and preferably between 0.08 and 0.12 second.

FIG. 12-B illustrates an exemplary user interface using a thumb-optimized virtual wheel control 1207, in accordance with an embodiment of the present invention a preferred embodiment of the present invention. The present embodiment is useful when navigating Web pages on touch-screen-based hand-held mobile devices. Web pages often feature many selectable items such as, but not limited to, links, check boxes, tabs, etc. On many desktop Web browsers, users can often "Tab through" the selectable items by using the Tab key repeatedly to move the "focus" from one selectable to the next or by using shift-Tab to move the "focus" through the selectable items in reverse order. The "focus" is marked visually often with a gray box around the selectable item that is in focus. The user can then select the item that is in focus by pressing a key on the keyboard such as, but not limited to, the space key or the enter key. Of course, most users usually simply use their mouse to select links on their desktop browser.

On a touch-screen-based hand-held device, a user may use their thumb to select links, but in some cases selecting one small link among several links clustered closely together may be a bit confusing since the user's thumb can cover up the link that the user is attempting to select. Another aspect of present invention teaches one way to aid the user in viewing covered links involving a "bubble" that shows link information when the link is being pressed. However, another solution contemplated is to allow a user to use a thumb-optimized virtual wheel to swiftly "roll" the focus back or forth through some or all of the selectable items on the page similar to the tabbing or shift-tabbing done on desktop browsers, but more quickly. Then the user can click a virtual button 1209, preferably positioned in the center of virtual wheel 1207 to select the item that is in focus. In the present embodiment, the user slides a thumb around thumb-optimized virtual wheel 1207 to swiftly "roll" a Web page "focus" 1208 through all of the selectable items, one by one. Then, when focus 1208 is on the item the user wants to select, indicated by highlighting such as, but not limited to a gray square, the user clicks virtual button 1209 in the center of virtual wheel 1207, to select that focus item, which in this case would simulate clicking on the highlighted link. In other embodiments, a virtual button that is not in the center of the wheel could be used to select the focus item. In this context, the "focus item" may simply be called the "focus". It is contemplated that the present embodiment and other embodiments using virtual control wheels may be implemented on devices without virtual keyboards, as well as devices with virtual keyboards.

More on Sizing and Placing Active Areas:

When a virtual selectable item or control has sufficient unused space around it, it is often fine to extend the active area well beyond the graphic target area, to make it particularly easy to select or operate, if is desirable for this item to be especially easy to select or operate. For example, without limitation, on a screen such as, but not limited to, the one illustrated in FIG. 10-B, where there are only a handful of selectable "search icons", an embodiment could reasonably extend the active areas for each of those icons up to about 10 mm all around the center of the icon. A user would then be very unlikely to "miss", when attempting to click on any of those targets. Alternatively, there may be some selectable items that the user may not want to select accidentally such as, but not limited to, a power button or a reset button. In some embodiments selectable items such as this may have relatively small active areas to minimize the risk of accidental activation.

As noted above, a 9 mm preferred minimum width on the active areas of the virtual alphabetic keyboard keys places a lower bound on the overall width of the virtual keyboard and the device itself, if the virtual keyboard has a standard set of alphabetic keys for a given language. For example, without limitation, for an English QWERTY keyboard, the top "Q" through "P" line consists of at least 10 keys corresponding to the letters Q, W, E, R, T, Y, U, I, O, and P, as shown by way of example in FIG. 1. If each of those keys has an active area that is at least 9 mm wide, the 10 keys together form a line that is at least 90 mm wide (3.54 inches), which is wider than the displays on most PDAs and PocketPCs. A 4-inch diagonal display is considered unusually large for PDAs and PocketPCs, and even a 4-inch diagonal display will typically have a width of only about 3.2 inches (81 mm). Most PDA and PocketPC displays are even smaller, so most PDAs and PocketPCs do not have displays that are wide enough to implement 9 mm active areas for the keys. And even on those that do, a virtual thumboard will still suffer from excessive error rates if it does not also meet the proper data delay constraint, as discussed above, as well as the proper size-related constraints discussed here. The embodiment illustrated in FIG. 1 has a 5-inch diagonal display that is large enough to fit a QWERTY keyboard whose alphabetic keys' active areas each have a width of 10 mm. Yet the device illustrated in FIG. 1 keeps a narrow frame on all four sides of the displays, which allows it to maintain an overall device width that is smaller than the long side of most PDAs and PocketPCs devices. Smaller active areas may be used so that the virtual keyboard fits on a traditional hand-held device, but if the active areas get below 9 mm across for the alphabet keys, thumb-typing error rates rise quickly for many users, even in embodiments that use a proper data delay.

Hand-held devices have been described that allow people to use a touch-screen to type by pressing thumbs on displayed virtual keyboard keys. However, it should be appreciated that the described points also apply more generally to hand-held devices that allow people to perform functions such as, but not limited to, using a touch-screen to use their thumbs to click virtual buttons, type virtual keys, or operate other types of virtual UI elements or controls, even controls like virtual scroll wheels. For example, without limitation, no matter what the user is pressing, it is beneficial to use a proper data delay, so the thumb has time to settle before the device determines that the user is attempting to press. And unless a virtual control's graphic target area is relatively large (e.g. 10 mm diameter or more) it generally improves accuracy to extend active areas beyond the virtual control's graphic target area for example, without limitation, how the active areas for alphabet keys in FIG. 9 extend beyond each key's graphic target area. As with many of the virtual keyboard keys illustrated in FIG. 9, user-control accuracy of virtual buttons and other types of virtual controls displayed on a hand-held device can generally be improved by extending the active area. In the specific exemplary embodiment shown in FIG. 9 active areas are extended at least 2 mm above the graphic target of the control and at least 1 mm toward whichever vertical edge is closer (the right edge or the left edge).

Note that user-interface programmers can easily manually code active-area sizes and placement using the above guidelines. Or alternatively, software can easily be developed to automatically create a "thumb-optimized" active-area size and placement for any given selectable item, given the item's graphical target, again by using the above guidelines. For example, without limitation, one algorithm for automatically specifying an active area for an item with a rectangular graphic target area would be to simply use the same rectangle for the active area, but extend the top of the active area's rectangle at least 5 mm higher than the graphical target's vertical center, if it is not already, and if it will not overlap a neighboring active area or graphical target. This algorithm also extends the side of the active area's rectangle that is closest to the device's side so it is at least 5 mm from the graphical target's horizontal center, if it is not already, and if it will not overlap a neighboring active area or graphical target. By using a slightly bigger number than 5 mm in that algorithm, the active areas will be even bigger as long as there is room given the other active areas, which can make thumb-selection of the item even more accurate and comfortable.

It should also be noted that if the active area for a virtual selectable item is made very large around the graphical target area for the item, it becomes almost impossible to make an error when trying to press the item's graphical target area, even if a "proper data delay" element (as discussed above) is not implemented, since the user will almost inevitably hit some part of the active area. However, when the goal is to have a device be palm-sized (e.g. ideally under 5-inches across) while displaying a standard looking virtual QWERTY keyboard, that naturally constrains the size of the keyboard and its keys. As discussed above, when the keyboard is palm-sized, not implementing proper data delay can lead to an increase in errors for many people, especially as the device and keyboard get smaller, or as people with larger hands try to thumb-type on the device. Therefore preferred embodiments of the present invention combine a proper data delay with proper active area sizing and placement.

Closest Key is not Good Enough:

Referring to FIG. 2, which reflects actual experimental data, it is shown that a virtual thumb-board implementation, or more generally, a device that allows users to use their thumbs to operate virtual buttons, keys, or other controls displayed on the touch screen, will be highly inaccurate for some people (i.e. produce frequent errors) if the implementation simply assumes that the key the user is trying to press is whichever key's graphic target is closest to the "touch point" or even the "settle point". For example, without limitation, in FIG. 2, when the user attempts to type the letter "O", touch point 201 was actually much closer to graphic target area 207 for the "P" key than to graphic target area 206 for the "O" key. By waiting for the thumb to settle (i.e. using a proper data delay as discussed above), and using settle point 202 instead of touch point 201, accuracy is greatly improved. But as explained in the previous section, even the key whose graphic target appears closest to the thumb's settle point is frequently not the key the user is intending to press with their thumb. For example, without limitation, in the experiment recorded in FIG. 9, one of the two times the user tried to press graphic target area 901 for the "L" key, the settle point where the user pressed was actually quite a bit closer to the "O" key's graphic target area than to graphic target area 901 for the "L" key. The same thing happened with several clicks on the "X", "N", and "K" keys. But, by properly sizing and placing the active areas relative to the graphic target areas (as discussed in the previous section), these clicks were properly interpreted by the embodiment of the virtual thumb-board illustrated by way of example in FIG. 9. Note that, on the physical prototype used for this experiment, users could only see the graphic target areas for the keys, not the active areas extending outside the target areas. For example, without limitation, they could see graphic target 903 for the "P" key, but not the outline for active area 904 for the "P" key. This encourages users to aim for the graphic target area of the key they want to hit, making their behavior more consistent than it would be if they felt they could aim anywhere within the larger active area for that key. As a reminder, FIGS. 2 through 7 show enlargements of keyboards that would actually be implemented about the same size as the keyboards illustrated by way of example in FIG. 1 and FIG. 9.

Proper Overall Width of Virtual Keyboard and Device:

Another aspect of embodiments of the present invention is having an upper bound on the overall width of the virtual keyboard. In the preferred embodiment, the overall size of the virtual keyboard visible at any given moment while the user is thumb-typing on the visual keyboard is no more than 130 mm wide. In embodiments where the keyboard is split roughly into two halves (e.g. a left half for the left thumb and a right half for the right thumb), each half should be no more than 65 mm wide, although extra space between the halves is acceptable. In embodiments where a continuous (non-split) keyboard is used, the overall width of the device as the user thumb-types should be no more than 135 mm.

If the virtual keyboard or the device is wider than these upper bounds, then average adult users, especially users with smaller than average hands, will have a difficult time reaching all of the keys with their thumbs without changing their grip on the device while typing. "Grip" in this context refers to how the user is holding the device. If a user frequently must change their grip while typing a sentence, it quickly becomes extremely inconvenient, to the point where it often causes them to type slower than they would otherwise. Users prefer to be able to keep their grip in one place and simply swing their thumbs around to the different keys. Users also find it most comfortable if they can wrap parts of their fingers around the sides of the device while thumb-typing. If a continuous keyboard is used, rather than a split keyboard, and the device is wider than 135 mm, users with average size adult hands, or smaller, will find it difficult to reach the keys in the middle of the virtual keyboard with their thumbs while wrapping parts of their fingers around the side of the device.

Experiments suggest that a preferred overall virtual keyboard width, if the target user is likely to be adult users, is between 100 mm and 115 mm wide. FIG. 1 illustrates an embodiment of a virtual keyboard that worked well in experiments, where the continuous virtual keyboard is about 105 mm wide, including some extra keys of various sizes, such as, but not limited to, quote key 104. Experiments also indicate that thumb-typing is most comfortable if the overall device is only a little wider than the overall virtual keyboard, preferably 110 mm 130 mm. This lets the user's hands wrap comfortably around the sides of the device while still being able to reach all of the keys with their thumbs. Device 105 illustrated in FIG. 1 is about 116 mm wide, about 11 mm wider than the virtual keyboard in this example. In preferred embodiments, the device should also be no more than about 1 inch thick, preferably considerably thinner, so it does not feel overly bulky in the user's hands or pocket.

Related Implementations:

Virtual thumboard implementations that adhere to the sizing of active areas and the proper overall width limitations outlined above are likely to perform better than conventional virtual thumboard attempts that do not adhere to those size constraints, even if these new implementations do not adhere to the activation force and data delay limits outlined above. However, implementations that also include one or both of the activation force and proper data delay limitations outlined above will provide an even better user experience. As discussed above, referring to FIG. 2 and FIG. 3, a proper data delay can significantly reduce error rates, even when the proper size-related constraints are followed. And a proper activation force can make typing feel more comfortable. Embodiments that comprise all of the foregoing aspects of the present invention tend to optimize the speed and comfort with which people can thumb-type on a virtual thumboard.

Prior attempted virtual thumboard implementations on pocket-size devices generally show fewer than 50 characters prior to (or surrounding) the character being typed at the moment. When the virtual thumboard is in use, those prior virtual thumboards typically consume 75% to 85% of the display, leaving only 15% to 25% of the display free to see the text being typed or the background context (e.g. the Web page or email document the user is writing or replying to). This leads to the user having to spend more time moving back and forth through the text they have typed, or back and forth between the typing mode and the content-viewing mode, which gets tedious. Therefore, it is useful to implement a virtual thumboard in a way that leaves significantly more of the display available, so the device and software can let the user view more of the text the user has been typing or more of the Web page or email to which the user is replying. Referring to FIG. 1, this embodiment of the present invention leaves 33%-40% of the display free even when the virtual thumboard is being used. For example, without limitation, if the user were typing an email, the email software could display four or five lines of text above the text insertion point for the user to feel comfortable knowing where they are in the email reply. Therefore, in preferred embodiments, the virtual thumboards consume less than 67% of the display while the user is thumb-typing.

Some embodiments may include audio feedback as the user types such as, but not limited to, a "click" sound each time the device types a character in response to the user pressing a virtual key. Some embodiments may also have extra visual feedback in addition to the character simply being typed such as, but not limited to, having the newly typed character flash. These features may become less important when the elements described previously are implemented such as, but not limited to, proper data delay and proper sizing of activation areas. However, it may still help some users to have audio feedback, to help pace a user's typing. Some embodiments may give the user an option of turning the audio feedback on or off, and perhaps an option of seeing extra visual feedback such as, but not limited to, a flashing character, as the user types characters.

For devices implementing a virtual thumboard, there is a potential for users to leave fingerprints or scratches on the touch-screen surface. Therefore, some embodiments may include a thin clear screen protector to attach over the touch-screen. Screen protectors such as this are available for many PDAs and Pocket PCs today. When clicking on the touch screen is referred to, it is contemplated to generally apply even if the user is clicking on the touch screen through a screen protector. If a screen protector is used with an embodiment of the present invention that is attempting to adhere to the proper activation force constraints discussed above, the user could still preferably activate the touch-screen with an activation force that is within the proper activation force constraints previously discussed.

Having fully described at least one embodiment of the present invention, other equivalent or alternative means for implementing systems and methods for thumb-optimized, touch-screen based typing and user interface controls for such systems and methods according to the present invention will be apparent to those skilled in the art. The invention has been described above by way of illustration, and the specific embodiments disclosed are not intended to limit the invention to the particular forms disclosed. The invention is thus to cover all modifications, equivalents, and alternatives falling within the spirit and scope of the following claims.

What is claimed is:

1. A method of receiving user input on a touch-screen display housed in a portable device, the method comprising:

providing a virtual keyboard having a plurality of virtual selectable items ("keys"), each configured to comprise a graphic target area displayed on said touchscreen with a visible indication of its edges, and an active area associated with the graphic target area, said active area including no visible indicator of its edges, all of said active areas are simultaneously active on the screen, the keys being arranged with their respective active areas adjacent to each other in rows, and wherein for at least a selected first key located toward the left side of the display, for every point in the first key's graphic target area that is within 25 mm of the left of the device frame or within 20 mm of the left side of the display area, and at least 25 mm from the bottom of the device frame or at least 20 mm from the bottom of the display area, the active area of said first key extends further toward the left side of the display than the right side, and wherein for at least one selected second key located toward the right side of the display, for every point in the second key's graphic target area that is within 25 mm of the right of the device frame or within 20 mm of the right side of the display area, and at least 25 mm from the bottom of the device frame or at least 20 mm from the bottom of the display area, the active area of said second key extends further toward the right side of the display than the left side;

registering touch engagement of one of the first or second keys in response to detecting an engagement event having corresponding positioning information that is located within said respective active area, but may be located outside of the respective graphic target area displayed on said touchscreen; and providing that a third plurality of keys which are part of the virtual keyboard and active simultaneously with the first and second keys, and each have a graphic target area displayed on said touchscreen with a visible indication of its edges, and an active area associated with the graphic target area, said active area including no visible indicator of its edges, in which the third keys' active areas are not offset to extend further toward either side edge.

2. The method of claim 1, wherein the respective active area is automatically extended at the side closest to the devices edge so it is at least 5 mm from the graphical target's horizontal center, if it is not already, and if it will not overlap a neighboring active area or graphical target.

3. A method of receiving user input on a touch-screen display housed in a portable device, the method comprising:
providing a virtual keyboard having a plurality of virtual selectable items, each configured to comprise a graphic target area displayed on said touchscreen with a visible indication of its edges, and an active area associated with the graphic target area, said active area including no visible indicator of its edges, all of said active areas are simultaneously active on the screen, the virtual selectable items being arranged with their respective active areas adjacent to each other in rows, and in which a first selected one of the virtual selectable items in a row of the virtual keyboard includes a graphic target area and an active area associated with the graphic target area, the active area being offset to extend more towards the proximal side display edge than the distal side display edge, the proximal side edge for the first selected one item being the right side display edge, a second selected one of the virtual selectable items in a row of the virtual keyboard includes a graphic target area and an active area associated with the graphic target area, the active area being offset to extend more towards the proximal side display edge than the distal side display edge, the proximal side edge for the second selected one item being the left side display edge; and
providing that a third plurality of virtual selectable items which are part of the virtual keyboard and active simultaneously with the first and second items, and each have a graphic target area displayed on said touchscreen with a visible indication of its edges, and an active area associated with the graphic target area, said active area including no visible indicator of its edges, in which the third plurality of virtual selectable items' active areas are not offset to extend further toward either side edge.

4. The method of claim 3 in which at least one of the virtual selectable items in a central area of a lower letter row of the virtual keyboard includes a graphic target area and an active area associated with the active area, the active area being offset to extend more towards the lower display edge than the upper display edge as measured from the center of the corresponding graphic target area.

5. The method of claim 3, in which the offset is both horizontal and vertical.

6. The method of claim 1, in which registering the touch engagement of said virtual selectable item further includes employing an engagement delay time approximately equal to the amount of time for the thumb sufficiently settles in a fixed place for the touch-screen positioning information to be useful in registering the intended engagement of the touch-screen.

7. The method of claim 1 in which detecting an engagement even further comprises:
providing an engagement signal that indicates the touch-screen has been engaged with at least a predetermined engagement level;
measuring an amount of time elapsed from when said engagement signal becomes active after detecting said predetermined engagement level;
registering an engagement event if said engagement signal continues to be active after an engagement delay time has occurred for the touch-screen positioning information to be useful in registering intended engagement of the touch-screen; and
locating at least the approximate coordinates on the touch-screen where touch is applied at the time the engagement event is registered and providing said coordinates as the positioning information of the engagement event.

8. The method of claim 7, in which said engagement delay time is at least in_part based on the amount of time typically required for a user's thumb to initially engage the touch-screen and the time when the thumb sufficiently settles for the touch-screen positioning information to be useful in registering the intended engagement of the touch-screen.

9. The method of claim 7, further comprising an engagement delay time between about 0.05 second and about 0.19 second.

10. The method of claim 9, in which said engagement delay time is between 0.08 second and about 0.14 second.

11. The method of claim 1, further comprising an engagement delay time giving the thumb enough time to settle down to reach a settle point for thumb press.

12. The method of claim 1, further comprising while the user presses a finger down on the active area, displaying second information related to the covered information in a box or "bubble," the second information positioned away from an area at which the finger is pressed so as to not be covered by the user's finger and so as to help the user properly position their finger on a target item under the finger.

13. The method of claim 3, further comprising while the user presses a finger down on the active area, displaying second information related to the covered information in a box or "bubble," the second information positioned away from an area at which the finger is pressed so as to not be covered by the user's finger and so as to help the user properly position their finger on a target item under the finger.

14. The method of claim 1, in which the active area at least fully encompasses the graphic target area.

15. The method of claim 3, in which the active areas at least fully encompasses their respective associated graphic target areas.

16. The method of claim 1, further wherein the first key has an first adjacent key also having an active area extending further toward the left as described, and wherein the second key has a second adjacent key also having an active area extending further toward the right as described.

17. The method of claim 16, in which the respective adjacent keys are adjacent horizontally.

18. The method of claim 16, in which the respective adjacent keys are adjacent vertically.

19. The method of claim 3, further wherein the first virtual selectable item has an first adjacent virtual selectable item also having an active area extending further toward the left as described, and wherein the second virtual selectable item has a second adjacent virtual selectable item also having an active area extending further toward the right as described.

20. The method of claim 16, in which the respective adjacent virtual selectable items are adjacent horizontally.

21. The method of claim 16, in which the respective adjacent virtual selectable times are adjacent vertically.

* * * * *